United States Patent
Tanaka et al.

[19]

[11] Patent Number: 6,148,101

[45] Date of Patent: Nov. 14, 2000

[54] DIGITAL IMAGE PROCESSOR

[75] Inventors: Mamoru Tanaka, Hoya; Hiroshi Inoue, Yokohama; Masaaki Imaizumi, Tokyo; Toshiaki Shingu, Kawasaki, all of Japan

[73] Assignee: Canon Kabushiki Kaisha, Tokyo, Japan

[21] Appl. No.: 08/755,140

[22] Filed: Nov. 22, 1996

[30] Foreign Application Priority Data

Nov. 27, 1995 [JP] Japan ..................................... 7-307305
Jan. 17, 1996 [JP] Japan ..................................... 8-005686

[51] Int. Cl.⁷ .................................................... G06K 9/62
[52] U.S. Cl. ............................ 382/156; 382/158; 706/29; 706/16
[58] Field of Search ..................................... 382/156, 157, 382/158; 706/16, 33, 40, 38, 20, 10, 29

[56] References Cited

U.S. PATENT DOCUMENTS

| 5,140,670 | 8/1992 | Chua et al. ................................ 706/29 |
| 5,253,330 | 10/1993 | Ramacher et al. ......................... 395/27 |
| 5,355,528 | 10/1994 | Roska et al. ............................... 706/38 |
| 5,598,509 | 1/1997 | Takahashi et al. ......................... 706/20 |
| 5,717,834 | 2/1998 | Werblin et al. ............................ 706/16 |
| 5,864,836 | 1/1999 | Balsi et al. ................................. 706/40 |

FOREIGN PATENT DOCUMENTS

| 0474246 | 11/1992 | European Pat. Off. . |
| 0606987 | 7/1994 | European Pat. Off. . |
| 0778696 | 11/1997 | European Pat. Off. . |
| WO9119267 | 12/1991 | WIPO . |

OTHER PUBLICATIONS

Realisation of a digital cellular neural network for image processing—Doan et al. in CNNA–1994, IEEE International Workshop Dec. 18–21 1994.

A reconfigurable architecture mapping multilayer CNN paradigms—Raffo et al., in CNNA—94, IEEE International Workshop, Dec. 18–21 1994.

Harrer, et al., "Discrete–Time Cellular Neural Networks", International Journal of Circuit Theory and Applications, vol. 20, pp. 453–467 (1992).

Harrer, "Multiple Layer Discrete–Time Cellular Neural Networks Using Time–Variant Templates", IEEE Transactions on Circuits and Systems II, 40(1993) Mar., No. 3, New York, US.

Crounse, "Image Halftoning with Cellular Neural Networks", IEEE Transactions on Circuits and Systems II, 40(1993) Apr., No. 4, New York, US.

*Primary Examiner*—Amelia Au
*Assistant Examiner*—Vikkram Bali
*Attorney, Agent, or Firm*—Fitzpatrick, Cella, Harper & Scinto

[57] ABSTRACT

Taking into consideration the disadvantage that a large-scale analog neural network cannot be constructed as an LSI and, even if this were possible, the cost would be prohibitive and the network would lack universality, a digital image processor for processing input image data based upon a cellular neural network is provided with a first multiply-and-accumulate arithmetic unit for digitally processing multiplication and accumulation of input image data of a plurality of pixels and input weighting values in a predetermined area, a second multiply-and-accumulate arithmetic unit for digitally processing multiplication and accumulation of output image data of a plurality of pixels and output weighting values in a predetermined area, and a non-linear acting unit for deciding output image data in accordance with results of calculation from the first and second multiply-and-accumulate arithmetic unit and non-linear characteristic parameters. This makes it possible to realize an image processor which excels in universality, ease of control and ease of integration.

17 Claims, 15 Drawing Sheets

FIG. 6

| 1,1 | 1,2 | 1,3 | 1,4 | 1,5 |
|-----|-----|-----|-----|-----|
| 2,1 | 2,2 | 2,3 | 2,4 | 2,5 |
| 3,1 | 3,2 | 3,3 | 3,4 | 3,5 |
| 4,1 | 4,2 | 4,3 | 4,4 | 4,5 |
| 5,1 | 5,2 | 5,3 | 5,4 | 5,5 |

FIG. 7

| -3 -3 | -2 -3 | -1 -3 | 0 -3 | 1 -3 | 2 -3 | 3 -3 |
|-------|-------|-------|------|------|------|------|
| -3 -2 | -2 -2 | -1 -2 | 0 -2 | 1 -2 | 2 -2 | 3 -2 |
| -3 -1 | -2 -1 | -1 -1 | 0 -1 | 1 -1 | 2 -1 | 3 -1 |
| -3  0 | -2  0 | -1  0 | 0  0 | 1  0 | 2  0 | 3  0 |
| -3  1 | -2  1 | -1  1 | 0  1 | 1  1 | 2  1 | 3  1 |
| -3  2 | -2  2 | -1  2 | 0  2 | 1  2 | 2  2 | 3  2 |
| -3  3 | -2  3 | -1  3 | 0  3 | 1  3 | 2  3 | 3  3 |

DIGITAL IMAGE PROCESSOR

BACKGROUND OF THE INVENTION

This invention relates to a digital image processor for subjecting input image data to digital image processing. More particularly, the invention relates to a digital image processor, which has a digital cellular neural network architecture (CNN) based upon a discrete-time cellular neural network (DTCNN), capable of subjecting input image data to a variety of image processing.

Converting an analog signal of a natural image to a digital signal of a digital halftone image usually is carried out by discretization in the time direction (sampling) and in the size direction (quantization). Such processing results in loss of information. However, if note is taken of the fact that a natural image contains many low-frequency components and exhibits strong correlation in a spatio-temporal neighborhood, a digital halftone image approximating the natural image can be obtained by quantization image processing involving a small number of bits. Quantization image processing involving a small number of bits is processing through which a digital halftone image expressed by a smaller number of bits is formed, by utilizing information in the spatio-temporal neighborhood area, from an analog natural image or from a quantized image consisting of a large number of bits obtained by A/D-converting each gray-level value of the analog natural image independently using an A/D converter that operates on a large number of bits.

The devided pixel digital halftoning (digital halftoning) method has long been used to form a pseudo-digital halftone image. This method entails reproducing grays by changing the percentage of black in a neighborhood image in order to reproduce a gray-level image by a black-and-white bi-level printer or display. Examples of such methods in practical use include the dither method, in which a gray level u(x,y) of the original image is compared with a threshold value T calculated in accordance with a set rule, and the extrapolative error diffusion method (the ordinary error diffusion method) in which the error between an input gray-level image value and an output halftone image is diffused to pixels that have not yet been scanned.

In a filtering operation in which each gray-level value of a neighboring pixel centered on a pixel of interest is multiplied by a suitable weighting value at the position of each pixel of interest and a weighted sum in the neighborhood area is outputted, a matrix in which the weighting value is an element is referred to as a spatial filter. The reaction at a point (i,j) of a pixel brought about by an image input $u_{kl}(t)$ in a processor N(k,l) (referred to as a "cell" below) of a point (k,l) belonging to the neighborhood Nr(i,j) of the point (i,j) of the pixel is expressed as follows:

$$R_{ij}(t) = \sum_{N(k,l) \in N_r(i,j)} w(i, j; k, l) u_{kl}(t) \quad (1)$$

This is referred to as a convolution of w(i,j;k,l) by $u_{kl}(t)$ or a multiply-and-accumulate operation applied to a weighting value w and variable u in the neighboring image area, and may be abbreviated to $R_{ij}(t)=(w*u)_{ij}$.

The dither method is expressed as follows, where U represents a unit function:

$$y_{ij} = U(u_{ij} - w*u - T_{ij}) \quad (2)$$

$$= \begin{cases} 1 & u_{ij} \geq (w*u)_{ij} + T_{ij} \\ 0 & \text{otherwise} \end{cases}$$

The extrapolative error diffusion method is a non-linear recursive system with respect to an input $u_{ij}(t)$ and output $y(t)=S_{ij}(t)$ at an (i,j)th raster scan. Equation with respect to this method is given as follows:

$$x_{ij} = \sum_{N(k,l) \in N_r(i,j)} w(i, j; k, l) g(x_{kl}) + u_{ij} \quad (3)$$

Here $k \leq i$, $j<i$ for k=i are the extrapolative conditions. Further, g(x)=S(x)−x holds. In case of binarization, y=S(x) becomes a sign function.

$$y_{ij} = sgn(x) \quad (4)$$

$$= \begin{cases} 1 & x \geq 0 \\ -1 & \text{otherwise} \end{cases}$$

Further, weighting $w_k$ is a weighting value, which is a parameter that influences the ensuing quantization. This decides the propagation of the quantization error or the way the quantization error is diffused. The weighting $w_k$ is negative and the total sum thereof must be −1.

In order to obtain a halftone image close to an analog natural image with a density pattern method or the dither method, a problem encountered is that the number of bits per pixel must be made fairly large. On the other hand, with the error diffusion method used in binarizing a digital image, a problem encountered is blurring of image having fine edges, as in the case of a minutely sampled character image. If the number of bits per pixel is increased, a problem that arises is the occurrence of a false contour which undergoes absolutely no change in a certain neighborhood only. This problem is brought about by the fact that error diffusion is made to scan in one direction.

Processing for quantizing an image involves a tradeoff among sampling rate, size of the quantization steps and quantization distortion. Accordingly, attention has been directed toward one type of optimization problem, namely the quantization of a digital halftone image in such a manner that it will approximate an input gray-level image, and parallel analog neural networks that solve this optimization problem have been proposed.

One of these is an analog symmetrical error diffusion neural network. The non-linear dynamics are described by an equation the same as that of Equation (34), referred to later, if the extrapolation conditions $k \leq i$, $j<i$ for k=i are removed. The hardware is realized by an analog neural network. In this case the quantization error of each pixel is diffused in analog fashion two-dimensionally to the surrounding neighborhood system.

An analog system referred to as a cellular neural network (CNN) also has been proposed. This is a method which employs a non-linear analog circuit in which cells are locally connected in systematic fashion. Each cell is composed of a capacitor, a resistor and a partitioning linear cell. Since the CNN performs analog processing in parallel fashion continuously in time, it is possible to implement real-time signal processing, which is held to be difficult with digital processing. Furthermore, in analog processing, it is possible to realize a technique in which a conversion is made to digital information in parallel fashion by the dynamic quantizing operation of a plurality of cells without using the sequential operation of a highly sophisticated A/D converter, and the digital information can be stored or transmitted in a parallel manner. The advantages of analog processing by a CNN are good coupling to sensors, voltage and current distributions of high speed, the rapid acquisition of overall information, and the fact that the multiply-and-accumulate operation can be carried out simply in parallel-processing fashion using the sum of currents. Though the cells in a CNN are connected only to neighboring cells, even cells that are not directly connected influence one another indirectly owing to the effects of propagation resulting from the dynamics of the system. In general, an M×N CNN has M×N cells arrayed in M rows and N columns. Let a cell of an ith row and jth column be represented by $C(i,j)$. An r–neighborhood system of the cell $C(i,j)$ is defined by the following equation:

$$Nr(i,j)=\{C(k,l) | \max\{|k-i|;|l-j|\} \le r,\ 1 \le k < M;\ 1 \le l \le N\} \quad (5)$$

where r represents a positive integer. In general, the neighborhood system of r=1 is referred to as a "3×3 neighborhood system," the neighborhood system of r=2 as a "5×5 neighborhood system," and the neighborhood system of r=3 as a "7×7 neighborhood system." If $C(i,j) \in N_r(k,l)$ holds for all $C(i,j)$ and $C(k,l)$ in these neighborhood systems owing to symmetry, then we will have $C(k,l) \in Nr(i,j)$. Each cell is composed of a capacitor, a resistor and a non-linear element which is partitioning linear. The equation of state of the cell $C(i,j)$ is expressed as follows with regard to a state variable $x_{ij}$, an input variable $u_{kl}$, an output variable $y_{ij}$, an offset I, a capacitor C, a resistor $R_x$ and an image $1 \le i \le M;\ 1 \le j \le N$:

Equation of State:

$$C\frac{d x_{ij}(t)}{dt} = -\frac{1}{R_x} X_{ij}(t) + \sum_{C(k,l) \in N_r(i,j)} A(i,j;k,l) y_{kl}(t) + \sum_{C(k,l) \in N_r(i,j)} B(i,j;k,l) u_{kl} + I \quad (6)$$

Output:

$$y_{ij}(t) = \tfrac{1}{2}(|x_{ij}+1|-|x_{ij}-1|) \quad (7)$$

$$|x_{ij}(0)| \le 1 \quad (8)$$

$$|u_{ij}| \le 1 \quad (9)$$

The parameters are assumed to be as follows:

$$A(i,j;k,l)=A(k,l;i,j), \quad \text{Eq. (10)}$$

$$C>0,\ R_x>0 \quad \text{Eq. (11)}$$

All of the cells in a CNN have the same circuit structure and element values. The number of cells in a neighborhood is $(2r+1)^2$. In terms of dynamics, a CNN possesses both an output feedback mechanism and a feed forward mechanism. The former depends upon an A-template, $A(i,j;k,l)$, and the latter depends upon a B-template, $B(i,j;k,l)$. These templates are programmable parameters. In order that all steady-state outputs of a cell will be fixed at ±1 in a CNN, the following theorem is used:

If the circuit parameter $A(i,j;i,j)$ at the center of the A-template satisfies the condition $$A(i,j;i,j) > 1/R_x \quad (12)$$

then the cell will converge to a single stable equilibrium point. In addition, the following equations will hold:

$$\lim_{t \to \infty} |x_{ij}(t)| > 1,\ 1 \le i \le m \quad (13)$$

$$\lim_{t \to \infty} |y_{ij}(t)| \pm 1\ \ 1 \le i \le m \quad (14)$$

This theorem makes the binarization of an image possible and is an analog error-minimization dynamics method.

The problem encountered with the analog symmetrical error-diffusion neural network and analog CNN according to the prior art is that an analog chip for large-scale image processing cannot be constructed merely by promulgating analog principles and theory in the form of technical papers.

Even if a CNN is premised on neighborhood connection, cells are provided in a number equivalent to the number of pixels and a plurality of neighborhood connections are made in terms of the overall image. This means that the wiring would occupy almost the entire area of the silicon area of the chip. In actuality, however, a large-scale analog neural network in which cells are deployed for all pixels cannot be constructed as an LSI and, even if it could, the cost would be prohibitive and render the idea impractical.

In a case where the values of templates are changed, the circuit must be re-designed, thereby detracting from universality.

In a case where an image processing technique using a CNN is applied to a display device such as a ferroelectric liquid crystal display (FLCD), i.e., where a moving image that has been subjected to binarization or grayscaling by a CNN is displayed on such an FLCD, the display develops flicker in still areas of the moving image when the pixel levels outputted by grayscaling constantly change.

SUMMARY OF THE INVENTION

Accordingly, an object of the present invention is to provide a digital image processor which, by virtue of using digital circuit architecture to construct a neural network, excels in universality, ease of control and ease of integration.

Another object of the present invention is to provide a digital image processor which, by selection of templates, is capable of executing a plurality of image processing operations by a single neural network.

A further object of the present invention is to provide a digital image processor through which pipeline processing of a neural network can be implemented and a high-quality image obtained at high speed.

Still another object of the present invention is to provide a digital image processor through which an image substantially faithful to an input image and quantized using a small number of bits can be obtained by taking into account the multiplication and accumulation of state values and state weighting values in an operation performed by a neural network.

Yet another object of the present invention is to provide a digital image processor through which an image substantially faithful to an input image and quantized using a small number of bits can be obtained by taking into account the multiplication and accumulation of image output values and state weighting values of a preceding frame in an operation performed by a neural network, and through which it is possible to obtain a high-quality moving image devoid of flicker in the background of the moving image.

According to the present invention, the foregoing objects are attained by providing a digital image processor for processing input image data based upon a cellular neural network, comprising first multiply-and-accumulate arithmetic means for digitally processing multiplication and accumulation of input image data of a plurality of pixels and input weighting values in a predetermined area, second multiply-and-accumulate arithmetic for digitally processing multiplication and accumulation of output image data of a plurality of pixels and output weighting values in a predetermined area, and non-linear acting means for deciding output image data in accordance with results of processing from the first and second multiply-and-accumulate arithmetic means and non-linear characteristic parameters.

According to the present invention, the foregoing objects are attained by providing a digital image processor for processing input image data based upon a cellular neural network, comprising first multiply-and-accumulate arithmetic for digitally processing multiplication and accumulation of input image data of a plurality of pixels and input weighting values in a predetermined area, second multiply-and-accumulate arithmetic means for digitally processing multiplication and accumulation of a plurality of pixels and output weighting values in a predetermined area, third multiply-and-accumulate arithmetic for digitally processing multiplication and accumulation of products of state values of a plurality of pixels and state weighting values in a predetermined area, and non-linear acting means for deciding output image data in accordance with results of processing from the first, second and third multiply-and-accumulate arithmetic means and non-linear characteristic parameters.

Further, the present invention provides a digital image processor for processing input image data based upon a cellular neural network, comprising a plurality of processors, wherein an output halftone image of a small number of bits decided by one processor is transmitted to the next adjacent processor, this next adjacent processor executes an arithmetic operation based upon the received output halftone image of the small number of bits, and adjacent processors execute processing of the overall image at different positions thereof by a pipeline operation.

Further, the present invention provides a digital image processor for processing input image data based upon a cellular neural network, comprising first multiply-and-accumulate arithmetic for digitally processing multiplication and accumulation of input image data of a plurality of pixels and input weighting values in a predetermined area, second multiply-and-accumulate arithmetic means for digitally processing multiplication and accumulation of output image data of a plurality of pixels and first output weighting values in a predetermined area, third multiply-and-accumulate arithmetic for digitally processing multiplication and accumulation of output image data of a preceding frame and second output weighting values, and non-linear acting means for deciding output image data in accordance with results of processing from the first, second and third multiply-and-accumulate arithmetic means and non-linear characteristic parameters.

BRIEF DESCRIPTION OF THE DRAWINGS

FIG. 6 is a diagram showing an example of a processed image;

FIG. 7 is a diagram for describing a neighborhood system of a processed image;

DESCRIPTION OF THE PREFERRED EMBODIMENTS

Figure 1:
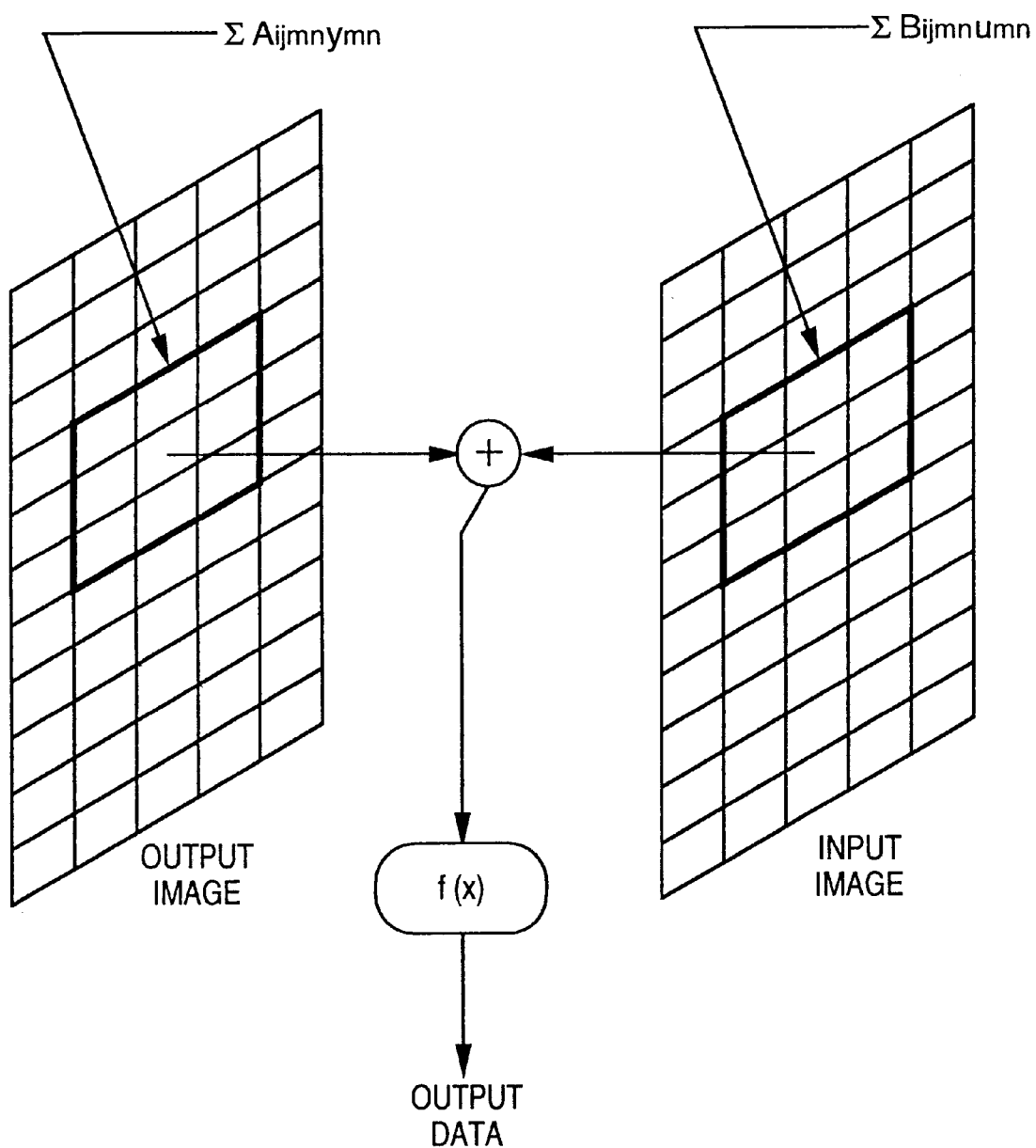
FIG. 1 is a diagram for describing the concept of image processing using a DTCNN in a first embodiment of the invention.

Embodiments of the present invention will now be described in detail. The principle of the embodiments will be described first.

The binarization of a gray-level image is extremely important in a bi-level printer or display. Simple binarization wherein an input gray-level pixel value is simply compared with a threshold value is suitable for a case where a character image or edge image is expressed but is inappropriate for expressing natural images. In the case of a natural image, therefore, use is made of the area gradation method such as the error diffusion method which, by utilizing the fact that correlation of a natural image is strong in a spatio-temporal neighborhood, reproduces tones by changing the percentage of black in the neighborhood image. This is extrapolative image processing through which an output halftone image of a small number of bits of each pixel is decided explicitly in accordance with raster scanning. Though a characterizing feature is high-speed, simple operation, problems in terms of image quality, such as poor edge preservation, are encountered. This means that finding a new quantization processing method to replace the conventional devided pixel digital halftoning also is important. Explicit extrapolative image processing mentioned here is conventional processing which decides output data by a single application of threshold-value processing to input data, as in the dither method and error diffusion method.

In general, the conversion of an analog signal to a digital signal is carried out by discretization in the time direction (sampling) and in the size direction (quantization). Considerable information is lost by executing both sampling processing and quantization processing in this fashion. Discretization along the time axis is performed by sampling and results in loss of frequency components that exceed the Nyquist frequency. Discretization in the size direction is carried out using a non-linear function y=f(x) in which x is the size of each sample. As for a characteristic of y=f(x) when performing multivalue processing, which is for example, greater than two-values, levels the number of which is equivalent to the number of quantization levels have the form of a staircase. If the number of quantization levels is small, generally the grayscale information is lost. Accordingly, the accuracy of digital half-tone representation must be evaluated based upon the error (distortion) between continuous values and discrete values.

Processing for quantizing an image signal should be considered as involving an optimization problem. For the sake of simplicity, let the size of an image be taken in one dimension. Sampled analog signals $u_i(i=1, \ldots N)$ are approximated by signals $y_i(i=1, \ldots N)$ of discontinuous values. Here u and y are N-dimensional vectors representing input and output signals, respectively. When a signal u is given, a level must be selected from quantization levels, which are given in advance, in such a manner that a distortion function d(u,y) is minimized.

If it is assumed that the size $\Delta$ of a quantization step is $\Delta \to 0$, then complete decoding (y→u) is possible. However, it is desired that the error be small and, moreover, that a large quantization step size $\Delta$ be obtained. If the distortion function is a mean squared error (MSE), we have $$d(u, y) = \frac{1}{N} \sum_{n=1}^{N} (y_i - u_i)^2 \qquad (15)$$
$$= \frac{1}{N}(y-u)^T(y-u) = \frac{1}{N}e^T e$$

In order to perform optimum quantization, the design must be such that the mean squared error is minimized, that the quantization level be closest to each sample $u_i$, and that the number of levels be as small as possible. In general, however, the optimum quantized signal $y_i$ depends upon the selection of the distortion function d(u,y). Moreover, since quantization inevitably gives rise to distortion, it is required that the selection of the distortion function d(u,y) be made to conform to the mechanism of human sense of sight. More specifically, quantization processing for obtaining a halftone image of small number of bits is executed so as to minimize the error between a multivalued image, which has been passed through a sensor filter, and the original image. This filter is derived from a frequency transfer characteristic (MTF) in visual system. This characteristic expresses the fact that the sensitivity of human sight approaches zero asymptotically as frequency approaches a high frequency spatially or temporally. The MTF is given by the following approximate expression:

$$MTF(f_r)=2.6(0.0192+0.114f_r)e^{-(0.114f_r)^{(1.1)}} \qquad (16)$$

The MTF is a bandpass filter which peaks when the characteristic gives 8 periods per 1% sight angle. It is known that if some gain of the low-frequency characteristic in the MTF is anticipated, the human visual filter closely resemble a Gaussian distribution. Accordingly, in this embodiment, a human visual filter is assumed to follow the Gaussian distribution upon taking into consideration the handling ease of the filter.

Liquid crystal displays have recently become very popular as an alternative to CRTs. In comparison with a CRT, a liquid crystal display can be made thinner and can be made to consume less power. Among these, ferroelectric liquid crystal displays (FLCDs), which are at the forefront of recent research, are of particular interest. An FLCD has outstanding features such as quick response and the fact that it lends itself to fabrication of a large-area panel and low cost. Basically, an FLCD constructs each output pixel using only two states, namely light and dark, by two molecular orientations. Accordingly, to express color tones, it is required that each output pixel value be reproduced at the area ratios of the respective RGB bits. This means that the number of colors that can be displayed is limited. In this case, the limited colors capable of being represented in a display are representative colors obtained by partitioning RGB color space uniformly. When an image is displayed on such an FLCD, the number of displayable colors will be small if each pixel value of the original image is subjected to simple quantization. The result is a displayed image of poor quality. It is necessary, therefore, that the original image be subjected to a quantization conversion that is suitable for display on this display device. Such a quantization conversion expresses gradation by changing the proportion of pixel values quantized in a certain neighborhood area. More specifically, if it is so arranged that a weighted sum total of pixel values quantized in a certain neighborhood will be equal to the pixel values of the original image, then, even if this is displayed on a limited-color display, an image close to the original can be made sensible by a human being through use of a human vision filter. The dither method and error diffusion method have been used heretofore to perform this quantization conversion.

First Embodiment

FIG. 1 is a diagram for describing the concept of image processing (bi-level or multivalued processing) using a DTCNN in a first embodiment of the invention. In the first embodiment, image processing by a DTCNN applied to a stationary image will be described.

In FIG. 1, the product sum$\Sigma$BijmnUmn obtained by multiplying and accumulating input gray-level images in a 3×3 neighborhood image area of an input image and input weighting values and the product sum $\Sigma$AijmnYmn obtained by multiplying and accumulating output image values of a small number of pixels in a 3×3 neighborhood image area of an output image and output weighting values are added, and the resulting sum is converted to output data by a linear output function f(x).

The input image is a gray-level image of a large number of bits, e.g., more than eight bits per pixel.

FIG. 1 illustrates the basic concept of this embodiment. According to the embodiment, however, image processing is eventually executed in accordance with Equations (17), (18) and (19) (where the latter is used at the time of binarization) indicated below.

When an image is composed of M×N pixels, the actual hardware of this embodiment is such that time-division processing is executed with a number of cells that is one or considerably less than the number of pixels. Virtually speaking, however, there are M×N cells, which are virtually arrayed on a grid plane. Each virtual cell operates in accordance with the following equations:

$$X_{ij}(t+1) = \sum_{C(k,l) \in N_r(i,j)} C(i,j;k,l)x_{kl}(t) + \sum_{C(k,l) \in N_r(i,j)} A(i,j;k,l)y_{kl}(t) + \qquad (17)$$

-continued $$\sum_{C(k,l)\in N_r(i,j)} B(i, j; k, l)u_{kl} + T_{ij} \quad (18)$$

$$Y_{ij}(t+1) = f[X_{ij}(t+1)]$$

Here $X_{ij}$ represents the state variable of a cell C(i,j) $U_{ij}$ the input variable of cell C(i,j), $Y_{ij}$ the output variable of cell C(i,j) and $T_{ij}$ the threshold-value constant of cell C(i,j). The non-linear output function f(x) generally is a multivalued function. In binarization of an image, however, f(x) is expressed by the following sign function:

$$f(x) = \begin{array}{l} 1(x \geq 0) \\ -1(x < 0) \end{array} \quad (19)$$

Equation (17) represents a first multiply-and-accumulate arithmetic portion for entering or calculating the sum $$\sum_{C(k,l)\in N_r(i,j)} B(i, j; k, l)u_{kl} + T_{kl}$$

of an offset and the sum of the products of input weighting values and input gray-level images in a neighborhood image area, a second multiply-and-accumulate arithmetic portion for calculating the product sum $$\sum_{C(k,l)\in N_r(i,j)} A(i, j; k, l)y_{kl}(t)$$

of output weighting values in a neighborhood image area and output halftone image values of a small number of bits already decided spatio-temporally, a third multiply-and-accumulate portion for calculating the product sum $$\sum_{C(k,l)\in N_r(i,j)} C(i, j; k, l)x_{kl}(t)$$

of state weighting values in a neighborhood image area and previous state values already decided spatio-temporally, and a state calculating portion, which is connected to the first, second and third multiply-and-accumulate arithmetic portions, for calculating present state values $x_{ij}(t+1)$ by adding the product sums from each of these multiply-and-accumulate arithmetic portions. Equation (19) represents a non-linear acting portion f(x), which is connected to the state calculating portion, for acting on the present state value non-linearly to decide a present output halftone image value, having a small number of bits, of each pixel. In these equations, a desired series of image processing operations can be executed selectively by selection of the input weighting values, output weighting values, offsets and state weighting values in the neighborhood image area, and by selection of parameters of the non-linear characteristic of the non-linear acting portion. In other words, by virtue of very simple processing for selecting parameters of templates A(i,j; k,l), B(i,j; k,l), C(i,j; k,l) and parameters of the offset $T_{ij}$, it is possible to universally select both extrapolative image processing for explicitly deciding an output halftone image, having a small number of bits, of each pixel in accordance with raster scanning, and interpolative image processing for implicitly deciding an output halftone image of a small number of bits when the image dynamically changes from an initial value, and a certain value is obtained.

Explicit extrapolative image processing is processing, such as the generally known dither method and error diffusion method, for deciding output data by a single threshold-value processing operation applied to input data. Implicit interpolative image processing is processing for changing the value of an output halftone image of a small number of bits and repeatedly executing processing, which performs the operations based upon Equations (17), (18), (19), each time until the ideal image is obtained, i.e., until a halftone image of a small number of bits comparatively faithful to the input gray-scale image is obtained.

Accordingly, as the result of processing in accordance with the interpolative error diffusion method, it is possible to prevent the problems which arise with conventional extrapolative error diffusion, namely the characteristic striped patterns and false contours, as well as the occurrence of granular noise in the highlight portions of an image. The result is that an output image that is faithful to the original can be obtained.

In this embodiment, extrapolative image processing and interpolative image processing can be selected by selection of templates.

In particular, with the dither method based upon extrapolative image processing, template A(i,j; k,l)=0, C(i,j; k,l)=0, and only B(i,j; k,l) is used. With interpolative error diffusion, the settings are such that templates A(i,j; k,l), B(i,j; k,l), C(i,j; k,l)=−A(i,j; k,l). In this case, it is so arranged that the templates contain only elements corresponding to scanned portions in such a manner that an output halftone image of a small number of bits of each pixel is explicitly decided in accordance with raster scanning. Further, it is so arranged that the templates A(i,j; k,l), B(i,j; k,l), C(i,j; k,l)=−A(i,j; k,l) contain only elements corresponding to portions not yet scanned (for which output values have not yet been decided) in such a manner that an output halftone image of a small number of bits of each pixel is implicitly decided. Further, in a case where quantization image processing of a small number of bits based upon the error-minimization dynamics method is performed, C(i,j; k,l)=0 and A(i,j; k,l), B(i,j; k,l) are used, and it is so arranged that the template A(i,j; k,l) also contains elements corresponding to portions not yet scanned (for which output values have not yet been decided) in such a manner that an output halftone image of a small number of bits of each pixel is implicitly decided.

Furthermore, in a case where interpolative image processing for an implicit determination is executed in this embodiment, an output halftone image, having a small number of bits, updated last in a general-purpose digital image processor is transmitted to another adjacent general-purpose digital image processor, unit (cell) for processing a pixel of interest in this adjacent general-purpose image processor regards the received updated output halftone image of the small number of bits as information from an adjacent area, and interpolative image processing is speeded up by pipeline means for multiplying and accumulating this image and the output weighting value.

Described first will be an example in which quantization image processing of a small number of bits is executed using A(i,j; k,l) and B(i,j; k,l) and not C(i,j; k,l). In this case, the operation of each virtual cell is expressed in simple fashion by the following equation:

$$X_{ij} = \sum_{kl} A(i, j; k, l)y_{kl}(t) + \sum_{kl} B(i, j; k, l)u_{kl} \quad (20)$$

$$y_{ij}(t+1) = f(X_{ij})$$

Here A(i,j; k,l) and B(i,j; k,l) are weightings from (k,l) to (i,j) programmable by the target image processing. Further, $y_{ij}$, $u_{ij}$ are an output and input of cell (i,j). The DTCNN of Equation (20) includes a first multiply-and-accumulate arithmetic portion for at least entering or calculating the product sum B(i,j; k,l)$u_{kl}$ of input weighting values and input gray-level images in a neighborhood image area, a second multiply-and-accumulate arithmetic portion for executing the operation of product sum A(i,j; k,l)$y_{kl}$(t) of input weighting values in a neighborhood image area and output halftone image values, of a small number of bits, already decided spatio-temporally, and a non-linear acting portion ($x_{ij}$), which is connected to the first and second multiply-and-accumulate arithmetic portions, for deciding a present-time output halftone image value of a small number of bits of each pixel. A desired series of image processing operations can be executed selectively by selection of the input weighting values, output weighting values and by selection of parameters of the non-linear characteristic of the non-linear acting portion. If a sign function or unit function is used as a non-linear function of a cell output in this DTCNN, the output is limited to binary values. In such case, a comparator for comparing A(i,j; k,l) $y_{kl}$(t) and B(i,j; k,l) $u_{kl}$ is adopted as the basic component. In general, the non-linear acting portion enlarges the output function to a staircase function, whereby it is possible to make the output multivalued. A RAM, ROM or PLA for storing the non-linear characteristic is adopted as a basic component in such a manner that the quantization step size can be varied. Further, for the sake of stability, self-feedback is made zero, i.e., it is arranged so that element A(i,j; i,j)=0 holds, an each cell should be made to operate asynchronously. However, these are not necessarily essential conditions. At times a non-zero A(i,j; i,j) may be used or all cells may be operated synchronously.

A specific configuration will now be described as a first embodiment of the invention.

Figure 2:
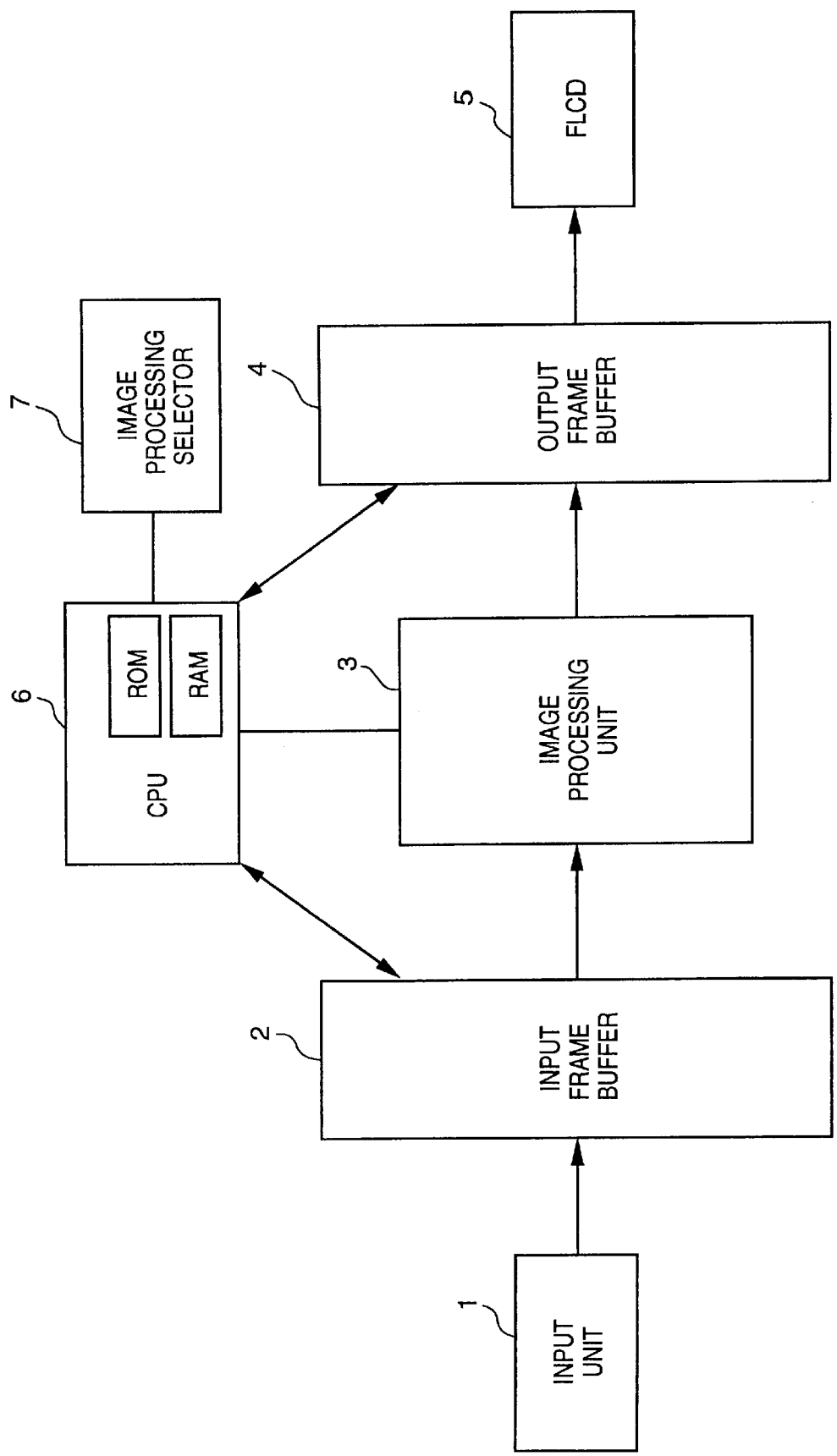
FIG. 2 is a block diagram illustrating the configuration of a display system internally incorporating a digital image processor according to the first embodiment.

FIG. 2 is a block diagram illustrating the configuration of a display system internally incorporating a digital image processor according to the first embodiment of the invention.

Shown in FIG. 2 is an image input unit 1 for entering a gray-level image comprising a plurality of bits per pixel. By way of example, the image input unit is constituted by a camera, scanner and computer. An input frame buffer 2 temporarily stores at least a plurality of lines of image data. An image processing unit 3 executes processing to quantize the multivalued gray-level image data, which comprises a plurality of bits per pixel, to image data having a smaller number of levels (bits). In accordance with the selection of template and non-linear characteristic described above, the image processing unit 3 is capable of selecting the desired image processing from a plurality of types of image processing. An output frame buffer 4 stores the quantized output data and delivers its output to a ferroelectric liquid crystal display (FLCD) unit 5. A CPU 6, which is connected to the input frame buffer 2, image processing unit 3 and output frame buffer 4, performs address control for data transfer and control of image processing. The CPU 6 is provided with a ROM storing a control program and a RAM serving as a work area. An image processing selector 7 allows the operator to freely select image processing to be executed by the image processing unit 3. In accordance with the selection made by the selector 7, the CPU 6 instructs the image processing unit 3 of the template and non-linear characteristic which will be used by the image processing unit 3. Selection of offset also is possible by a processor element in FIG. 10, described below, in which the selector 7 is capable of selecting an offset value as well.

Figure 3:
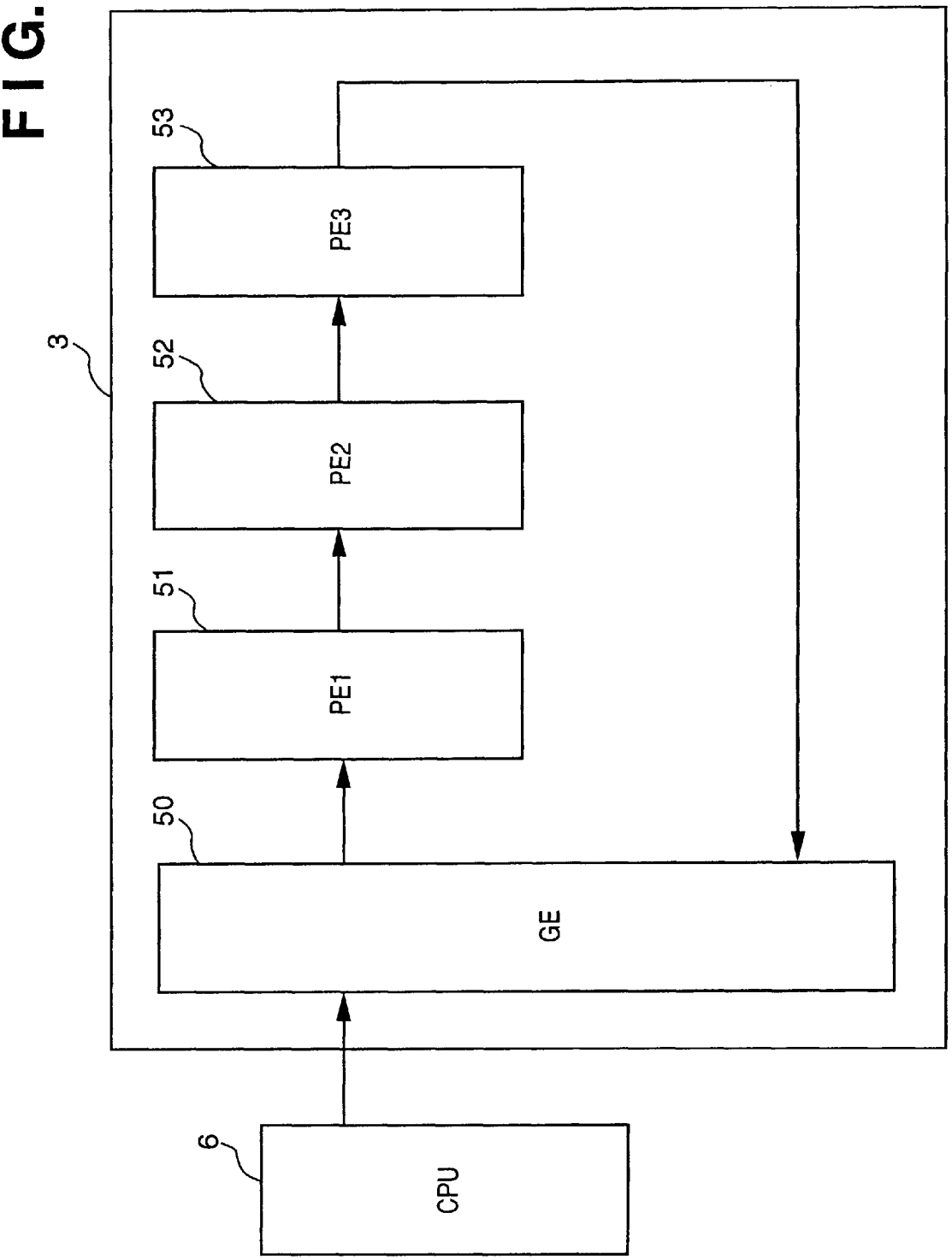
FIG. 3 is a diagram showing an image processing unit from FIG. 2 in greater detail, the unit consisting of a plurality of processor elements connected in pipeline fashion.

FIG. 3 illustrates the details of the image processing unit 3. The image processing unit 3 comprises processor elements (PEs) 51~53 and a gateway processor (GE) 50. The PEs 51, 52 and 53 are identically constructed processors and are pipeline-connected. Each processes a different position of the input image.

Figure 4:
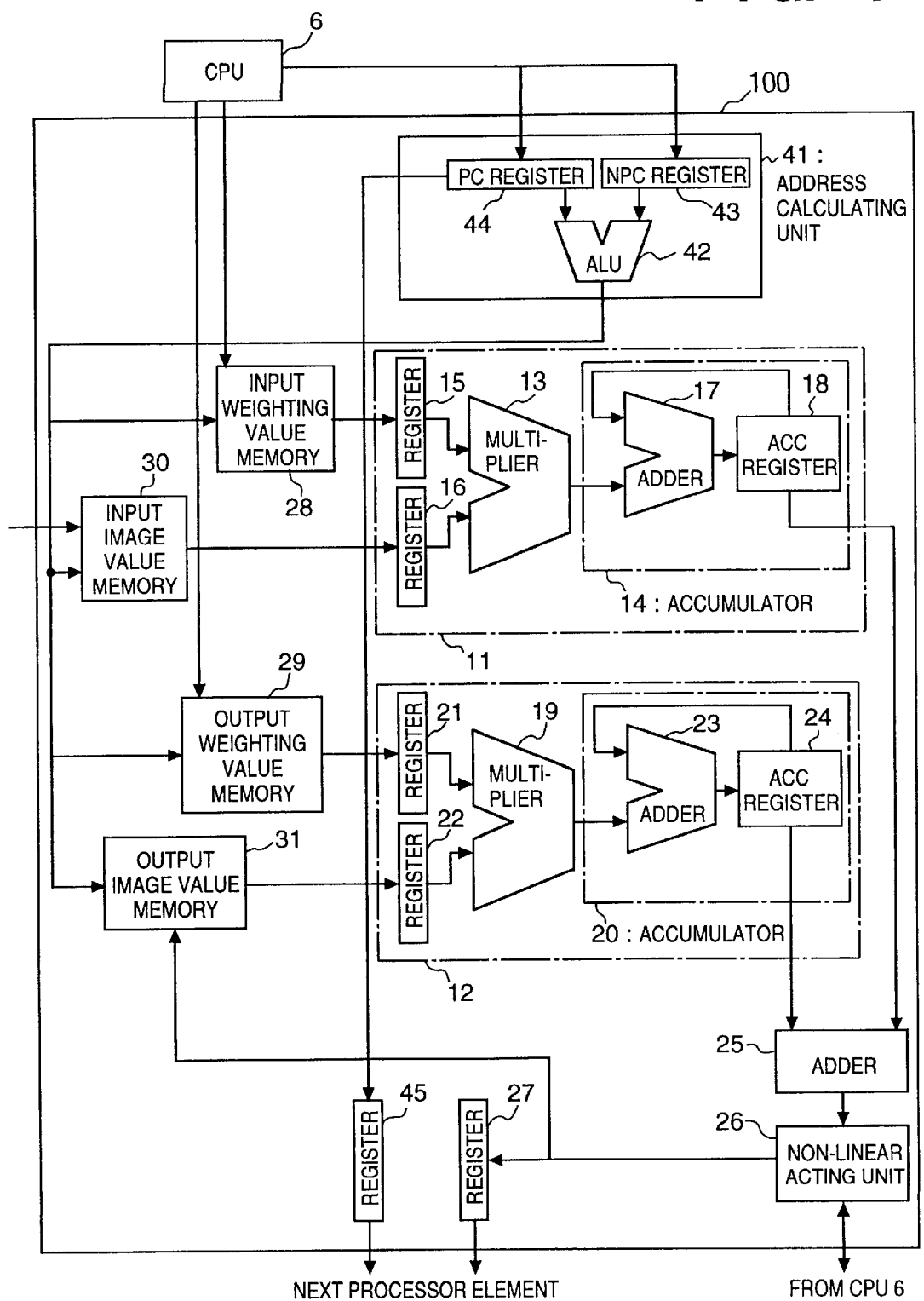
FIG. 4 is a block diagram showing the details of a processor element.

FIG. 4 is a block diagram showing the details of a processor element PE. The PEs 51, 52 and 53 each consist of the hardware shown in FIG. 4. Here one of the PEs is designated at 100. The PE 100 includes a memory 30 for storing a gray-level image that resides in a neighborhood image area composed of a plurality of pixels sent from an input frame buffer, a memory 28 for storing each weighing value in the neighborhood image area, a memory 31 for storing an output halftone image of a small number of bits in a neighborhood image area, a memory 29 for storing an output characteristic, and an address calculating unit 41 which calculates address values for accessing the memories 28, 29, 30 and 31. The address calculating unit 41 comprises an ALU 42, an NPC register 43 and a PC register 44.

The memories 28, 29, 30 and 31 are located within the processor but may be provided externally of the processor.

A plurality of weighting values are stored in each of the memories 28, 29. A weighting value is selected in accordance with a command from the CPU 6 indicating the type of image processing.

The processor 100 further includes a first multiply-and-accumulate arithmetic unit 11 for calculating the product sum B(i,j; k,l)$u_{kl}$ of data in the memory 28 storing the input weighting values in the neighborhood image area and the data in the memory 30 storing the input gray-level image. The first multiply-and-accumulate arithmetic unit 11 comprises a multiplier 13, an accumulator 14 and registers 15, 16. The registers 15, 16 latch the input gray-level image $u_{kl}$ and the weighting value B(i,j; k,l) fetched from the memories 28, 30, respectively. The accumulator 14 includes an adder 17 and an ACC register 18.

The processor 100 further includes a second multiply-and-accumulate arithmetic unit 12 for calculating the product sum A(i,j; k,l)$y_{kl}$(t) of data in the memory 29 storing the output weighting values and the output halftone image values in the memory 31. The second multiply-and-accumulate arithmetic unit 12 comprises a multiplier 19, an accumulator 20 and registers 21, 22.

The registers 22, 21 latch the output halftone image $y_{kl}$(t) and weighting value A(i,j; k,l) fetched from the memories 31, 29, respectively. The accumulator 20 includes an adder 23 and an ACC register 24.

The registers 18, 24, 27, 43 and 44 in processor 100 perform the functions described below.

The PC register 44 stores the address of a pixel to be processed. The NPC register 43 stores the image position of a neighborhood system.

As for the values stored in the NPC 43, values from (−3,−3) to (3,3) are stored, as shown in FIG. 7, assuming that the neighborhood system used in processing has a maximum size of 7×7. For this reason the register incorporates an incrementer that is capable of updating these values.

When the operation for summing the products of weighting values in the neighborhood system and output halftone images of a low number of bits is performed, the addresses of the neighborhood pixels are calculated from the values in the NPC register 43 and PC register 44, and these pixel values are fetched.

The ACC register 18 accumulates the results of calculating the product sum of the pixel of interest and its neighborhood system in the first multiply-and-accumulate arithmetic unit.

The ACC register 24 accumulates the results of calculating the product sum of the pixel of interest and its neighborhood system in the second multiply-and-accumulate arithmetic unit.

The multiply-and-accumulate calculation in cell operation is performed using the values in these registers 15, 16, 18, 21, 22, 24, 43 and 44.

Accordingly, at the stage of the multiply-and-accumulate calculation, a two-stage pipeline stage, which consists of data fetching and multiplication/accumulation, is formed.

A register 27 and an N-ADRS register 45 are necessary for pipeline processing, described below, and make possible an exchange of data between processors. More specifically, the register 27 holds an output value (P-REG) obtained by the final calculation, and the register 45 holds an address (N-ADRS) used when this result is written in memory.

For example, in a case where the small number of output bits of the output halftone image value are two in number, the weighting should be seven bits+one sign bit, and the output should be two bits without a sign. Since the arithmetic multiplier is composed of two bits in this case, the multiply-and-accumulate operation can also be performed by constructing an array of adders.

The address calculating unit 41 calculates an address from the NPC register 43 and the PC register 44.

The instructions executed are as follows:

neigh: an instruction for obtaining the address of a neighborhood designated by the NPC;

lineinc: an instruction for incrementing the value of a pixel of interest in the x direction;

colinc: an instruction for incrementing the value of a pixel of interest in the y direction.

The processor 100 includes an adder 25 for adding together the operational results from the first multiply-and-accumulate arithmetic unit 11 and the operational results from the second multiply-and-accumulate arithmetic unit 12, and a non-linear acting unit 26 for deciding an output halftone image value of a small number of bits based upon the results from the adder 25.

The product sum $B(i,j; k,l)u_{kl}$ is calculated by the first multiply-and-accumulate arithmetic unit 11, the product sum $A(i,j; k,l)y_{kl}$ is calculated by the second multiply-and-accumulate arithmetic unit 12, and the sum of $B(i,j; k,l)u_{kl}$ and $A(i,j; k,l)y_{kl}$ is obtained by the adder 25. The non-linear acting unit 26 for deciding the present-time output halftone image value of a small number of bits of each pixel basically is constituted by a RAM, ROM and PLA for programmably storing a non-linear characteristic. However, in a case where an output is fixed at two bits or the like, the basic component is a comparator.

In this case, whether the result of the multiply-and-accumulate operation is positive or negative is distinguished by the most significant bit so that it may be determined at which position along the x axis of the non-linear function this value is located.

Figure 5:
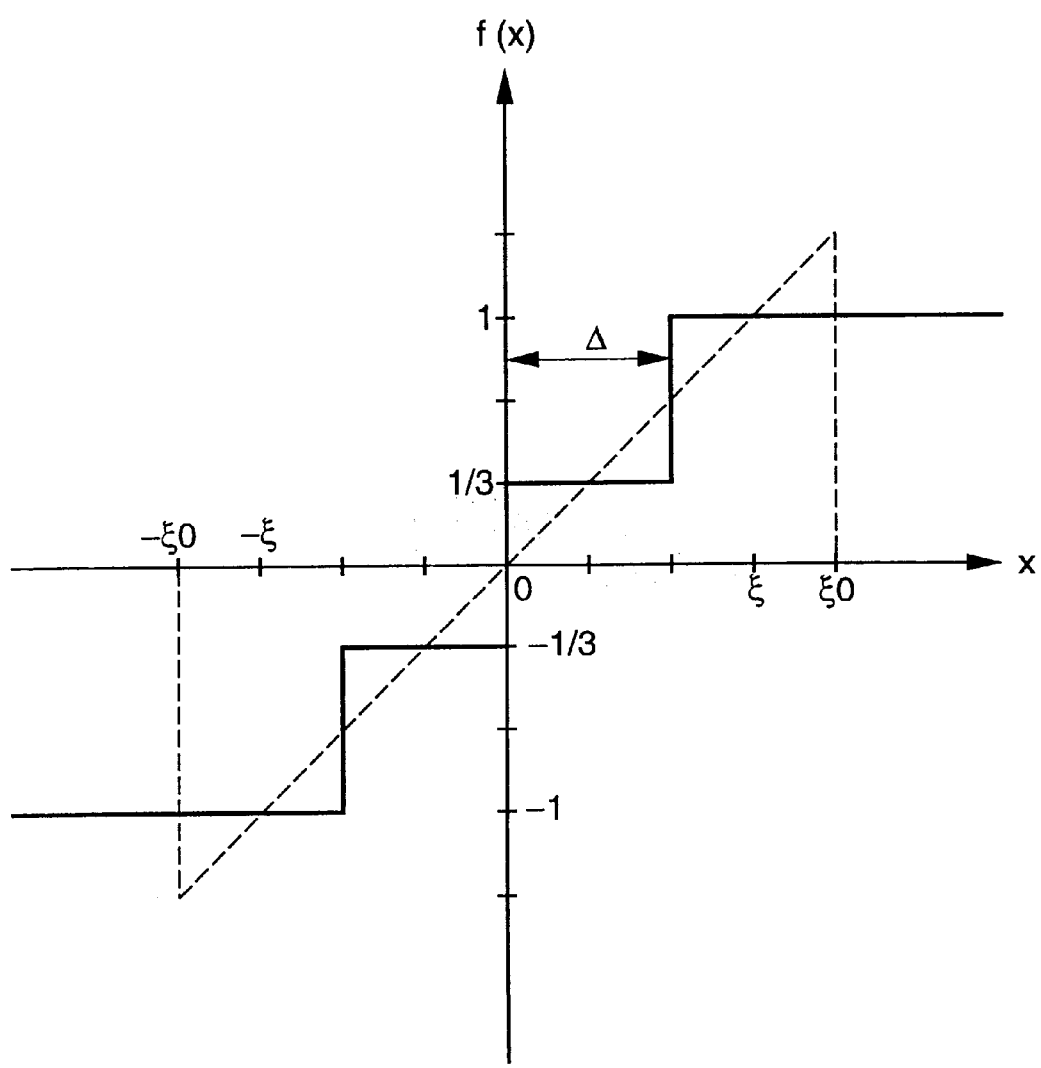
FIG. 5 is a diagram showing an example of a non-linear function.

FIG. 5 is a diagram showing an example of the non-linear function used by the non-linear acting unit 26. The output is assumed to be two bits.

Here the result from the adder 25 is decided as being the x axis and the value of f(x) thus determined is decided as being an output halftone image value composed of a small number of bits. The non-linear function used by the non-linear acting unit 26 also can be selected by the CPU 6 in accordance with the command from the image processing selector 7. The number of output bits can be selected by this selection of function.

When dynamic digital processing is executed through a sequential operation by a single processor, a large number of recursion computations are required and a large quantity of computations and a long period of time are needed for the output halftone image to converge to an optimum value.

Accordingly, in this embodiment, each processor is provided with a unidirectional data bus and a linked-structure processor network is adopted to accelerate the convergence of the output of the DTCNN. By virtue of this architecture, it is possible for a pipeline operation between processors. The architecture of this network is shown in FIG. 3.

In FIG. 3, the PE1, PE2 and PE3 51, 52 and 53, respectively, are identical to the general-purpose image processor 100 of this embodiment. These are referred to as processor elements here. The GE (gateway processor) 50 is hardware for managing various commands to the PEs 51, 52, 53 and for managing the distribution of the input image. Each of PEs 51, 52, 53 locally possesses the input gray-level image memory 30 in FIG. 4, the output halftone image memory 31, the memory 29 for storing the parameters of the output weighting A(i,j; k,l) necessary for processing, and the memory 28 for storing the parameter of the input weighting B(i,j; k,l). Each PE subjects the input gray-level image to image processing which is basically the multiply-and-accumulate operation and the non-linear action. Each preceding PE stores the latest updated output halftone image value $y_{kl}$ in the register 27 and stores the address indicating this pixel position in the special-purpose register 45. The stored values are sent to the PE connected as the next stage and the PE of this succeeding stage uses the address value to write the latest updated output halftone image value $y_{kl}$ at the designated address of its own memory. This operation is performed by each processor connected in the link, thereby making it possible to accelerate the convergence of the output halftone image.

For example, in a case where the small 5×5 image of FIG. 6 is subjected to pipeline processing by the PE1 and PE2, each PE processes a 3×3 image neighborhood area, which is centered on the pixel (i,j), through the following sequences:

PE1: (1,1), (1,2), . . . (1,5), (2,1), (2,2), . . . , (5,5); and
PE2: (2,3), (2,4), (2,5), (3,1), (3,2), . . . , (5,5), (1,1), (1,2) . . . (2,2).

TABLE 1

| TIME | PIXEL | RECEIVE |
|------|-------|---------|
| 1 | (1,1) | (2,2) |
| 2 | (1,2) | (2,3) |
| 3 | (1,3) | (2,4) |
| 4 | (1,4) | (2,5) |
| 5 | (1,5) | (3,1) |
| 6 | (2,1) | (3,2) |
|   |       | updating by PE2 |

Table 1 illustrates the concept of pipeline processing. The PE1 "receives" the output halftone image value of the small number of bits updated last by the PE2, and executes the multiply-and-accumulate operation and non-linear processing using this image value as the output halftone image value of the small number of bits from the neighborhood.

Figure 8:
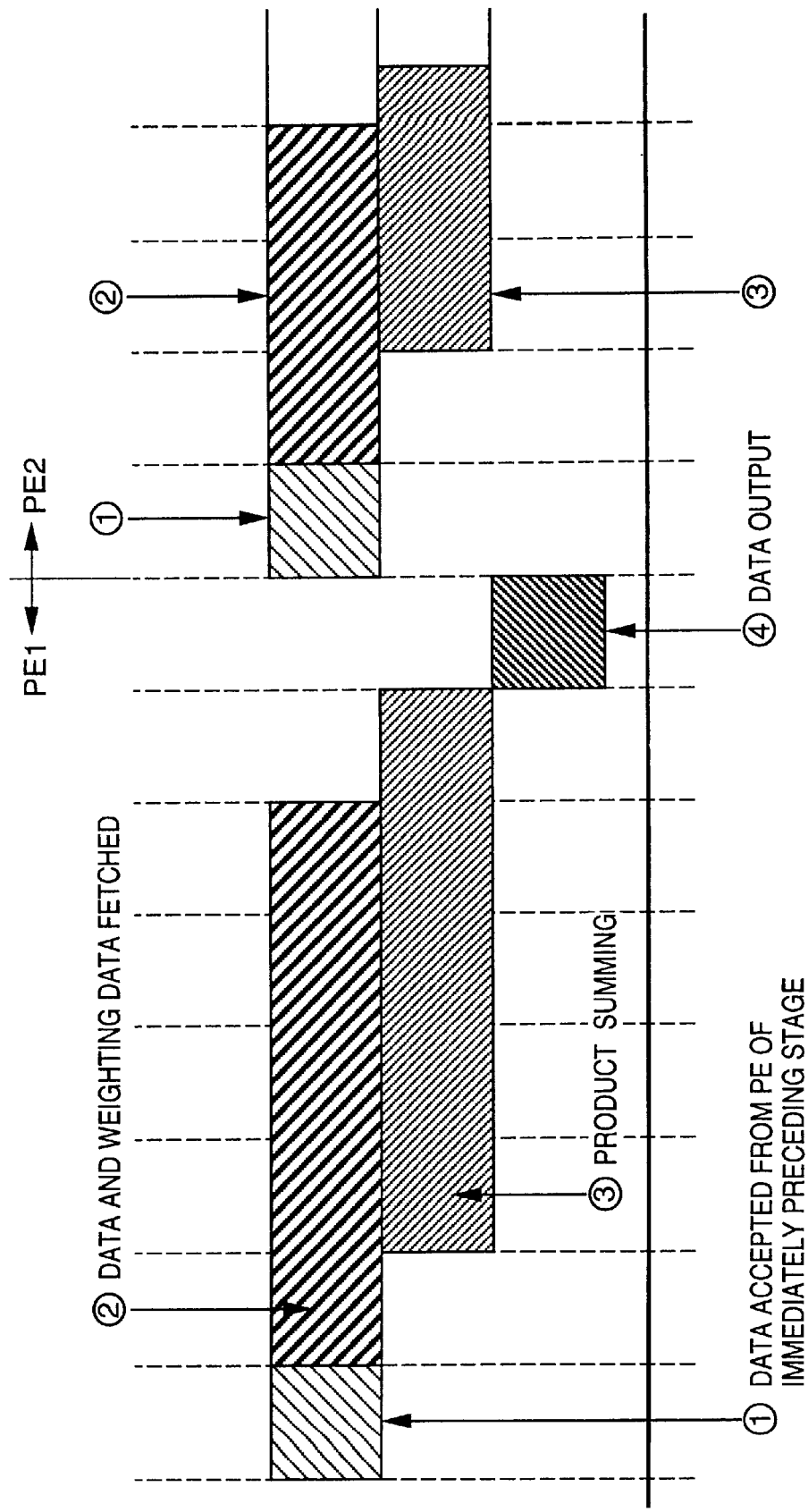
FIG. 8 is a processing time chart associated with a processor element.

With this network, each processor need only be provided with a unidirectional data bus. This makes it possible to hold down the cost of hardware for data communication. It is also possible to gather a larger number of processors on a chip. The computation algorithm of the general-purpose image processor (PE) is as set forth below. Here the processing will be described with reference to FIG. 8. FIG. 8 mainly illustrates a time chart of data processing executed by one PE.

The PE1 and PE2 are pipeline-connected in FIG. 8.

1. Starting and Initial Setting

The PE is started up by an externally performed start-up control operation. At this time the following indications are applied: an indication of the extent of the neighborhood area in processing, an indication of the size of the input image of interest, and an indication of various templates. The registers are initialized first. In initialization, the address at which processing starts is applied to the PC, and values made to conform to the extent of the neighborhood system to undergo processing are applied to the NPC. In addition, the ACC register is initialized to zero.

2. Data Transmission Stage

This is a stage in which the value $y_{kl}$ is read in from the preceding PE and the value is written in the PE's memory in the processor array. The latest output halftone image value $y_{kl}$ and the address value corresponding to it are accepted and the value $y_{kl}$ is written at the address having this address value. This corresponds to ① in FIG. 8.

3. Data Fetching and Multiply-and-Accumulate Stage

The address of the required neighborhood is calculated from the values in the PC and NPC, the output halftone image value of this address is read in from the memory 31 and latched in the latch 22. The weighting value A(i,j; k,l) corresponding to this neighborhood is read in from the memory 29 and latched in the register 21. Further, the input image value is read in from the memory 30 and latched in the register 16. The weighting is read in from the memory 28 and latched in the register 15. This corresponds to ② in FIG. 8. The multiply-and-accumulate operation $P+A(i,j; k,l)y_{kl}(t)$ and $P+B(i,j; k,l)u_{kl}$ with regard to the present content P of the accumulator is performed in the next clock cycle [③ in FIG. 8] with respect to the value latched in the ACC register 24.

The fetching of data and calculation of sum of the products are carried out through pipeline operation.

4. Output Stage

The newly updated output value $y_{ij}$ is obtained from the result of the multiply-and-accumulate operation $\Sigma A(i,j; k,l) y_{kl}$ and the result of the multiply-and-accumulate operation $\Sigma B(i,j; k\ l)u_{kl}$, and this value is written in memory [④ in FIG. 8].

Figure 9:
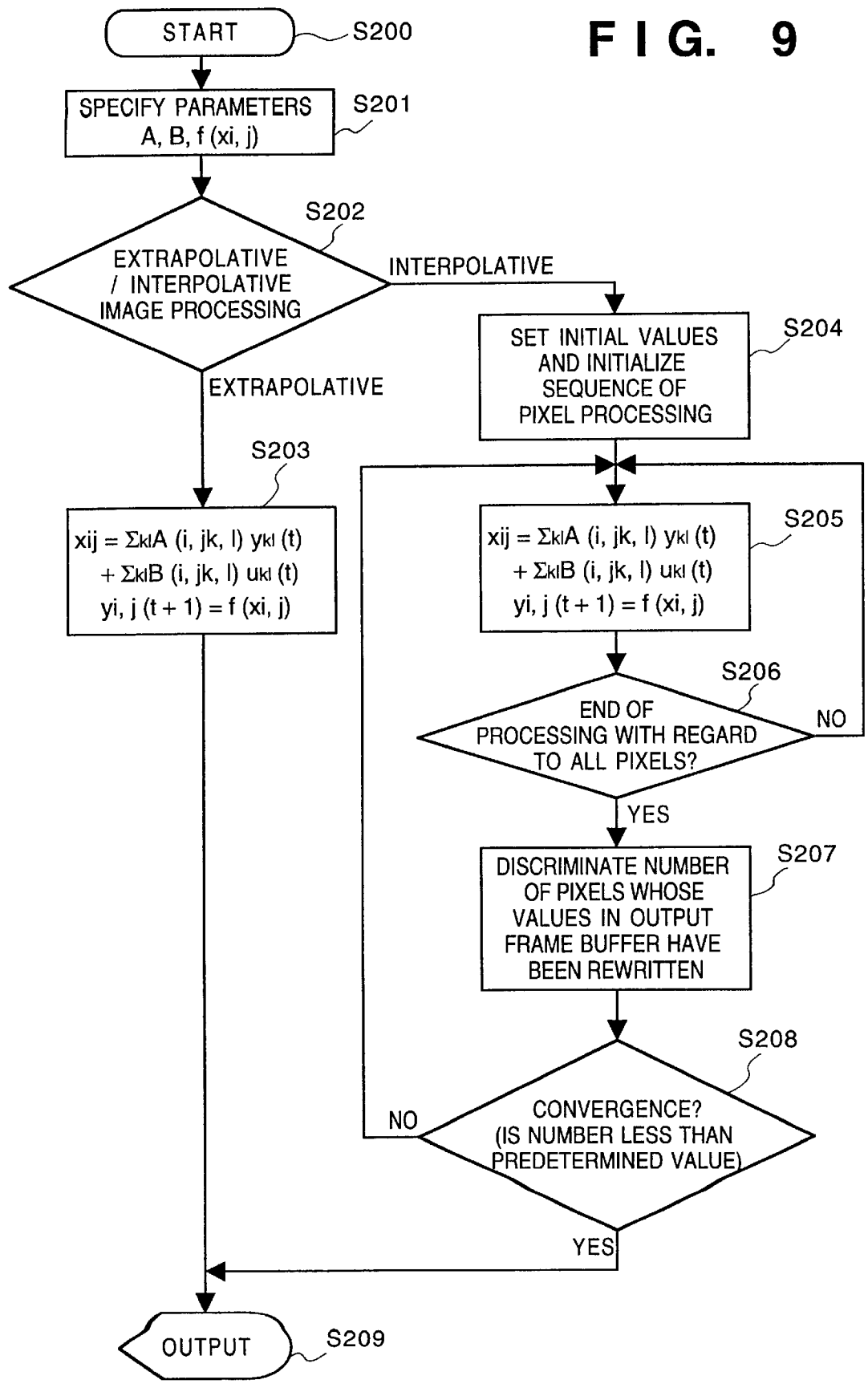
FIG. 9 is a processing flowchart associated with a processor element.

FIG. 9 illustrates the operation control flowchart of the processor 100 conforming to the selection of the parameters A, B in FIG. 4. This control will be described. The flowchart of FIG. 9 is executed by the CPU 6.

Step 200 (S200)

Operation is started.

Step 201 (S201)

In accordance with the selection from the selector 7 of FIG. 2, the CPU 6 instructs the image processing unit 3 of the template values A, B and non-linear function f(xi,j) to be used by the image processing unit 3.

Step 202 (S202)

The image processing method (extrapolative or interpolative) is discriminated based upon the specified template values. Extrapolative image processing (e.g., dithering) is discriminated when A=0 holds. In a case where both A and B are used, interpolative processing is discriminated.

Step 203 (S203)

A command is sent to the processor 100 and the operation based upon Equation (20) is performed. The ykl(t) which prevails at this time is adopted as the output value. Since extrapolative processing is executed here, the output value is decided by a single processing operation.

Step 204 (S204)

An initial value is set in the output frame buffer 4 at step S204. Here random bi-level data are set in the output frame buffer. Further, when the multiply-and-accumulate operation is executed with regard to all pixel input data of one screen, the sequence of this operation is set at step S204. The sequence of this operation is given an order such that all pixels will be scanned randomly.

Step 205 (S205)

At step S205, a command is issued to the processor element 100 based upon the order decided at step S204, the operation of Equation (20) is executed and an output value is obtained.

This result is sent to the output frame buffer 6. In a case where this is different from an already stored value, the value is rewritten.

Step 206 (S206)

It is determined at step S206 whether the processing of all entered pixels has ended. If this processing has not ended, the program proceeds to step S205. Here the pixel of interest is changed based upon the sequence of operation set randomly at step S204, and the multiply-and-accumulate operation is executed.

Step 207 (S207)

If it is determined at step S206 that the processing of all pixels has ended, then the program proceeds to step S207, where the number of pixels rewritten in the output frame buffer 4 is discriminated.

Step 208 (S208), Step 209 (S209)

It is determined whether the number of pixels discriminated at step S207 is less than a predetermined value. If the number is less than the predetermined value, then it is judged that the operation based upon the neural network has converged, and the program proceeds to step S209. Here one screen of data in the output frame buffer 4 are sent to the FLCD display. Further, if it is found at step S208 that the number of pixels discriminated at step S207 is greater than the predetermined value, then the processing of steps S205~S207 is repeated.

In this flowchart, the image processing method is discriminated based upon the template values. However, an arrangement may be adopted in which the image processing method can be selected separately of the template values at step S201.

Described next will optimization design method related to selection of the weighting values in the neighborhood image area and the parameters of the non-linear characteristic. First, the principle of the method will be described.

The size of the input image is assumed to be M×N. In the DTCNN of this embodiment, discrete values can be directly expressed by applying a plurality of equally spaced output levels to one cell. Since each cell in the DTCNN has outputs of a plurality of levels, the cell is referred to as a multivalued cell. The non-linear output function f(x) in the case of a multivalued cell is a linear function which converts x to n-number of discrete value levels, i.e., $$f(x) = \begin{matrix} 1 & (x \geq 1) \\ g(x) & (-1 \leq x \leq 1) \\ -1 & (x < -1) \end{matrix} \quad (21)$$

The function g(x) is a uniform (linear) quantization function in which $\Delta$ is the quantization step.

$$g(x) = \begin{cases} \Delta\left(\left[\dfrac{x}{\Delta} + \dfrac{1}{2}\right]\right) & (n \text{ is odd}) \\ \Delta\left(\left[\dfrac{x}{\Delta}\right] + \dfrac{1}{2}\right) & (n \text{ is even}) \end{cases} \quad (22)$$

$$\Delta = \frac{2}{n-1}$$

Here [ ] is a Gaussian symbol. FIG. 5 described above illustrates f(x) in a case where n=4 holds. Accordingly, the output y of the multivalued cell represents discrete values of n-number (n≧2) of equally spaced levels in an interval (−1,1).

$$y \in \left\{ \frac{2k - (n-1)}{n-1} \,\bigg|\, k = 0, 1, \cdots, n-1 \right\} \quad (23)$$

For example, when n=4 holds, y becomes as follows, as illustrated in FIG. 5:

$$y \in \{-1, -\tfrac{1}{3}, \tfrac{1}{3}, 1\} \quad (24)$$

The energy function E(t) of a DTCNN which contains multivalued cells is defined as follows, where S' hereinbelow is assumed to be the same as T':

$$E(t) = -\frac{1}{2} \sum_{(i,j)} \sum_{(k,l)} A(i, j; k, l) y_{ij}(t) y_{kl}(t) - \sum_{(i,j)} \sum_{(k,l)} B(i, j; k, l) y_{ij}(t) u_{kl} - S \sum_{(i,j)} y_{ij}(t) + \frac{1}{2} \sum_{(i,j)} y_{ij}(t)^2 \quad (25)$$

In a case where a DTCNN including multivalued cells is applied to the optimization problem, the parameters of the network can be decided by comparing coefficients between the energy function and distortion function of the DTCNN.

The distortion function in image quantization processing generally is defined by the following equation:

$$\text{dist}(y, u) = (Q'y - R'u)^T (Q'y - R'u) \quad (26)$$

Here Q'=[Q(i,j; k,l)], R'=[R(i,j; k,l)] are suitably given coefficient matrices (filters) and both are assumed to be symmetrical. If the input u is defined, the quantity of dist(y,u) to be minimized is as follows:

$$\text{dist}(y, u) = \tfrac{1}{2} y^T Q'^T Q' y - y^T Q'^T R' u \quad (27)$$

Further, if the energy function of the DTCNN of Equation (25) is written in similar fashion using a matrix, we have $$E(t) = -\tfrac{1}{2} y^T A' y - y^T B' u - S'^T y + \tfrac{1}{2} y^T y \quad (28)$$

Here the matrix S' is a vector in which S is an element.

Each parameter of the network can be decided as follows by comparing Equations 27 and 28:

$$A' = \frac{1}{\delta}(-Q'^T Q' + \text{diag}\{Q'^T Q'\}) \quad (29)$$

$$B' = \frac{1}{\delta} Q'^T R'$$

$$S = 0$$

where δ is the value of a diagonal component of matrix $Q'^T Q'$.

With a DTCNN in which the outputs are limited to two values, the distortion function will always decrease monotonously merely by forcibly making the diagonal component of the matrix A' equal to 0. However, with a DTCNN that includes multivalued cells, it is necessary to effect normalization in such a manner that the coefficients of $y_{ij}^2$ in the cost function dist(y,u) become 1. At this time the energy function E(t) and the distortion function dist(y,u) are identical values. When the network has converged to a stable state, the minimal solution of the distortion function dist(y,u) can be obtained.

In particular, in a case where the aim is output of a halftone image having a small number of bits, a Gaussian filter H' approximating a filter of human vision is used. In order to decide the parameters of the DTCNN, therefore, the cost function dist(y,u) is defined by the following equation:

$$C_1(y, u) = \frac{1}{MN} \sum_{(i,j)} \sum_{(k,l)} H'(i, j; k, l) y_{kl} - u_{ij})^2 \quad (30)$$

$$C_2(y, u) = \frac{1}{MN} \sum_{(i,j)} (y_{ij} - u_{ij})^2$$

$$\text{dist}(y, u) = \alpha C_1(y, u) + \beta C_2(y, u)$$

where H' represents a filter of human vision, y a halftone-processed output multivalued image, u' an input image and $C_1(y,u)$ a term so configured that an output multivalued image y' visually sensed by a human being will approximate the input image u'. Further, $C_2(y,u)$ represents a limiting term so configured that the output level of a cell when an image is made multivalued will approximate the pixel level of the original image. If the limiting term were absent, the multivalued image would appear to be noisy when visually sensed by a human being. Making the limiting term too strong results in the appearance of false contours. In a case where binarization is carried out, this term would be unnecessary and we would have β=0.

Equation (30) means that $C_1(y,u)$ indicates the difference between the input image data uij and a value obtained by multiplying the output image data $y_{kl}$ by the filter H', and that $C_2(y,u)$ indicates the difference between the output image data and the input image data.

In this embodiment, templates are designed in such a manner that $C_1(y,u)$ and $C_2(y,u)$ both become small.

In a case where the DTCNN uses multivalued cells, it is required that normalization be performed in such a manner that the coefficient of yij² in the cost function dist(y,u) becomes 1. If the value of the diagonal component of the matrix $H'^T H'$ is δ, then the possible value of the coefficient of $y_{ij}^2$ in the cost function dist(y,u) is αδ in the case of $C_1(y,u)$ and β in the case of $C_2(y,u)$. Therefore, we have $$\alpha\delta + \beta = 1 \quad (31)$$

Accordingly, we have $$\alpha = \frac{1 - \beta}{\delta} \quad (32)$$

The network parameters are decided as follows by comparing the cost function dist(y,u) and the energy function of the DTCNN:

$$A' = \alpha(-H'^T H' + \text{diag}\{H'^T H'\})$$

$$B' = \alpha H' + \beta I' \quad (33)$$

If the input image is color, the image is resolved into an orthogonal coordinate system of RGB or the like and each plane is made multivalued independently. After convergence, the multivalued images of the respective planes are combined.

If $\beta=0$ holds, the multivalued image will appear to be noisy when visually sensed by a human being. If $\beta$ is made too large, false contours appear. For example, the best multivalued image is obtained when $\beta=0.15$ holds.

The evaluation of image quality is in the end required to be a objective one based upon human sight. Owing to the uniformity of processing, a texture corresponding to the size of the dither matrix obtained by the dither method is not produced. In addition, features at portions such as character areas or the like where there is a pronounced change, are preserved to a greater extent in comparison with the error diffusion method.

Next, an example in which the multiplication and accumulation of state weightings and state values indicated in Equation (17) is incorporated in the operations of the DTCNN will be described.

In the dynamics of interpolative error diffusion method in which an output halftone image of a small number of bits of each pixel changes dynamically from an initial value and the output halftone image of small number of bits when change has stopped is implicitly decided, use is made of $$X_{ij}(t+1) = \sum_{C(k,l) \in N_r(i,j)} C(i, j; k, l) x_{kl}(t) + \sum_{C(k,l) \in N_r(i,j)} A(i, j; k, l) y_{kl}(t) + \sum_{C(k,l) \in N_r(i,j)} B(i, j; k, l) u_{kl} + T_{ij} \quad (34)$$

$$y_{ij}(t+1) = f(x_{ij}(t+1))$$

obtained by discretization of the non-linear equation $$X_{ij} = \sum_{N(k,l) \in N_r(i,j)} w(i, j; k, l)(S(x) - x) + u_{ij} \quad (35)$$

with respect to the input $u_{ij}(t)$ and output $y(t)=S_{uij}(t)$ in the (i,j)th raster scan.

Figure 10:
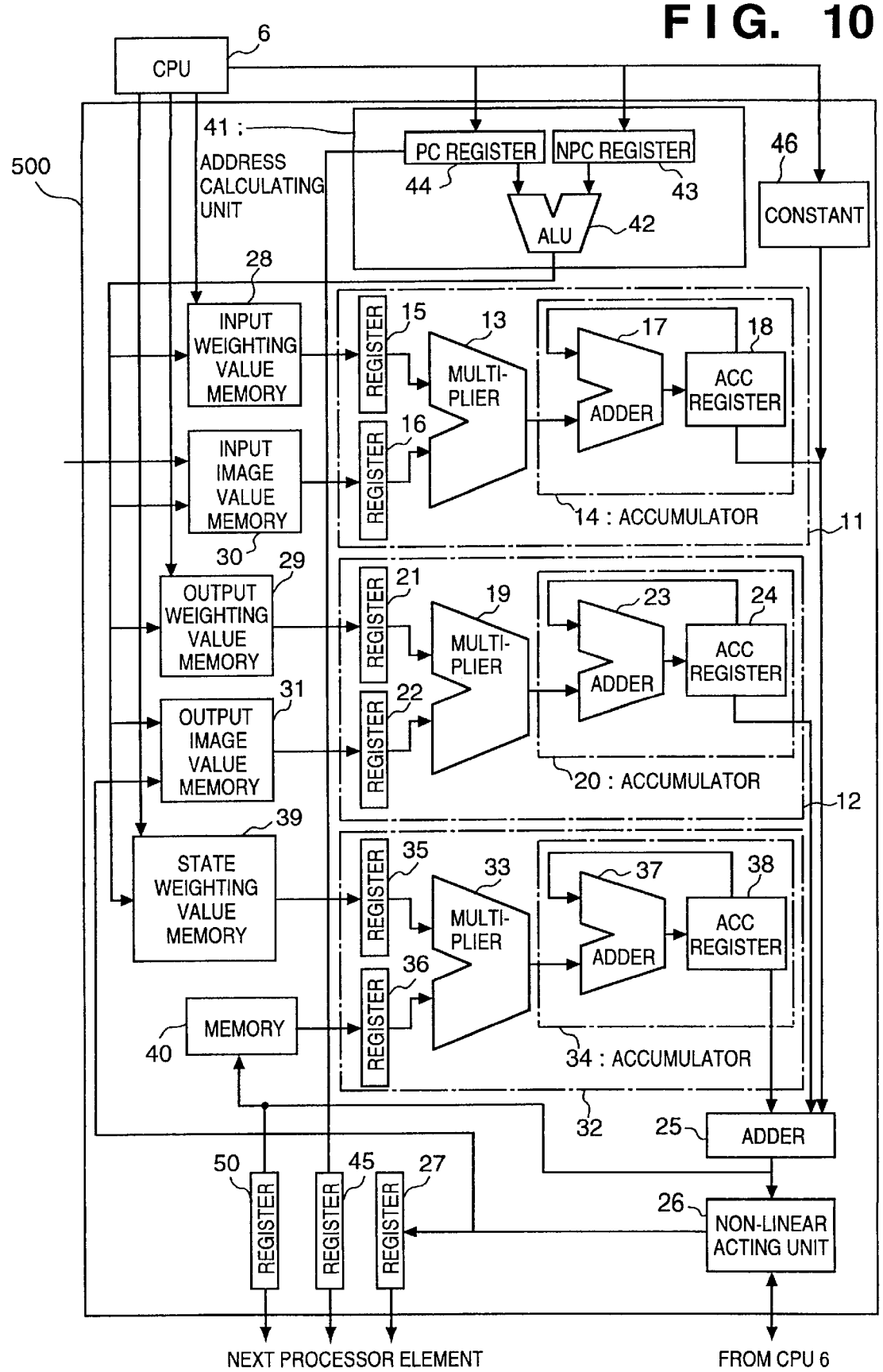
FIG. 10 is a block diagram showing the details of a processor element.

FIG. 10 illustrates the DTCNN of Equation (35) constituted by a digital image processing circuit. This will be described later in detail.

In Equation (35), it is possible to select the templates A, B, C, the offset T and the non-linear function $f[x_{i,j}(t+1)]$.

Equation (35) is obtained by adding the term of the sum of the products of the state values $X_{kl}$ and state distortion values $C(i,j; k,l)$ and the offset T to Equation (20).

Here a state value is a value prior to quantization using the non-linear function, i.e., a value of multivalued image data prior to binarization provided that data are to be quantized to bi-level data. By incorporating the multiplication and accumulation of state values and state distortion values, an output image faithful to the input image can be decided.

By selecting the value of the offset T, especially in the case of dither processing where the templates A, C are both zero and only the template B with regard to the input image is used, various threshold-value configurations of the dither matrix can be selected.

Thus, in this embodiment, it is possible to universally select, by selection of parameters referred to as templates A(i,j; k,l), B(i,j; k,l), C(i,j; k,l) in a neighborhood image area, both extrapolative image processing for explicitly deciding an output halftone image of a small number of bits of each pixel in accordance with raster scanning, and interpolative image processing in which an output of a halftone image of a small number of bits of each pixel is changed dynamically from an initial value and an output halftone image of a small number of bits prevailing when a certain value (a mid-course value or convergence value in dynamics) is implicitly decided. In particular, with the dither method serving as extrapolative image processing, the templates A(i,j; k,l)=0, C(i,j; k,l)=0 and only B(i,j; k,l) is used.

Here the dither matrix can be selected by selection of the offset T, and the output level can be selected by selection of the non-linear function.

In the extrapolative error diffusion method, templates A(i,j; k,l), B(i,j; k,l), C(i,j; k,l)=−A(i,j; k,l). In this case, it is so arranged that the templates include only elements corresponding to scanned portions in such a manner that an output halftone image of a small number of bits of each pixel will be explicitly decided in accordance with the raster scan. Further, it is so arranged that the templates A(i,j; k,l), B(i,j; k,l), C(i,j; k,l)=−A(i,j; k,l) also include elements corresponding to as yet unscanned portions in such a manner that an output halftone image of a small number of bits of each pixel will be implicitly decided. In a case where quantization image processing of a small number of bits based upon the error-minimization dynamics method is carried out, only A(i,j; k,l), B(i,j; k,l), B(i,j; k,l) are used and C(i,j; k,l)=0, and it is so arranged that the template A(i,j; k,l) also contains elements corresponding to portions not yet scanned in such a manner that an output halftone image of a small number of bits of each pixel is implicitly decided.

In any case, the number of output bits can be selected by selecting the non-linear function. FIG. 10 is a block diagram illustrating the architecture of a digital image processing unit for implementing the DTCNN of Equation (35) The processor 300 illustrated in FIG. 10 is shown to include one of the PEs 51, 52 and 53 depicted in FIG. 3, in the same manner as the processor 100 of FIG. 4, and the processor 300 is stored in each PEs 51, 52 and 53, and PEs 51, 52 and 53 are pipeline-connected. Blocks in FIG. 10 which have the same construction and perform the same processing as those shown in FIG. 4 are designated by like reference numerals.

FIG. 10 is a block diagram showing the details of a processor element PE. The PEs 51, 52 and 53 each consist of the hardware shown in FIG. 10. Here one of the processor elements (PEs) is designated at 300. The PE 300 includes the memory 30 for storing a gray-level image that resides in a neighborhood image area composed of a plurality of pixels sent from the input frame buffer 2 (FIG. 2), the memory 31 for storing an output halftone image of a small number of bits in a neighborhood image area, the memory 29 for storing an output weighting value, a memory 39 for storing a state weighting value, a memory 40 for storing a state value, and the address calculating unit 41 which calculates address values for accessing the memories 28, 29, 30, 31, 39 and 40. The address calculating unit 41 comprises the ALU 42, the NPC register 43 and the PC register 44. The memories 28, 29, 30, 31, 39 and 40 are located within the processor but may be provided externally of the processor.

A plurality of weightings are stored in each of the memories 28, 29 and 39. A weighting value is selected in accordance with a command from the CPU 6 indicating the type of image processing.

The processor 300 further includes the first multiply-and-accumulate arithmetic unit 11 for calculating the product sum $B(i,j; k,l)u_{kl}$ of data in the memory 28 storing the input weighting values in the neighborhood image area and the data in the memory 30 storing the input gray-level image.

The first multiply-and-accumulate arithmetic unit 11 comprises the multiplier 13, the accumulator 14 and the registers 15, 16. The registers 15, 16 latch the input gray-level image $u_{kl}$ and the weighting value B(i,j; k,l) fetched from the memories 28, 30, respectively. The accumulator 14 includes the adder 17 and the ACC register 18.

The processor 300 further includes the second multiply-and-accumulate arithmetic unit 12 for calculating the product sum A(i,j; k,l)$y_{kl}$(t) of data in the memory 29 storing the output weighting values and the output halftone image values in the memory 31. The second multiply-and-accumulate arithmetic unit 12 comprises the multiplier 19, the accumulator 20 and the registers 21, 22. The registers 22, 21 latch the output halftone image $Y_{kl}$(t) and weighting value A(i,j; k,l) fetched from the memories 31, 29, respectively. The accumulator 20 includes the adder 23 and the ACC register 24.

The processor 300 further includes a third multiply-and-accumulate arithmetic unit 32 for calculating the product sum C(i,j; k,l)$x_{kl}$(t) of data in the memory 39 storing the state weighting values and the state values in the memory 40. The third multiply-and-accumulate arithmetic unit 32 comprises a multiplier 33, an accumulator 34 and registers 35, 36. The registers 35, 36 latch the state weighting value C(i,j; k,l) and state value $x_{kl}$(t) fetched from the memories 39, 40, respectively. The accumulator 34 includes an adder 37 and the ACC register 38.

The registers 18, 24, 38, 43, 44, 27, 45 and 50 in the processor 300 perform the functions described below.

The PC register 44 stores the address of a pixel to be processed. The NPC register 43 stores the image position of a neighborhood system. As for the values stored in the NPC 43, values from (−3,−3) to (3,3) are stored, as shown in FIG. 7, assuming that the neighborhood system used in processing has a maximum size of 7×7. For this reason the register incorporates an incrementer that is capable of updating these values.

When the operation for multiplying and accumulating weighting values in the neighborhood system and output halftone images of a low number of bits is performed, the addresses of the neighborhood pixels are calculated from the values in the NPC register 43 and PC register 44 and these pixel values are fetched.

The ACC register 18 accumulates the results of calculating the product sum of the pixel of interest and its neighborhood system in the first multiply-and-accumulate arithmetic unit.

The ACC register 24 accumulates the results of calculating the product sum of the pixel of interest and its neighborhood system in the second multiply-and-accumulate arithmetic unit.

The ACC register 38 accumulates the results of calculating the product sum of the pixel of interest and its neighborhood system in the third multiply-and-accumulate arithmetic unit.

The multiply-and-accumulate calculation in cell operation is performed using the values in these registers 15, 16, 18, 21, 22, 24, 35, 36, 38, 43 and 44.

Accordingly, at the stage of product-sum calculation, a two-stage pipeline stage, which consists of data fetching and multiplication/accumulation, is formed.

The register 27, the register 45 and a register 50 are necessary for pipeline processing, described below, and make possible an exchange of data between processors. More specifically, the register 27 holds an output value obtained by the final calculation, the register 50 holds a state value obtained by the final calculation, and the register 45 holds an address used when this result is written in memory.

For example, in a case where the small number of output bits of the output halftone image value are two in number, the weighting should be seven bits +one sign bit, and the output should be two bits without a sign. Since the arithmetic multiplier is composed of two bits in this case, the multiply-and-accumulate operation can also be performed by constructing an array of adders. The address calculating unit 41 calculates an address from the PC register 43 and the PC register 44. The instructions executed are as follows:

neigh: an instruction for obtaining the address of a neighborhood designated by the NPC;

lineinc: an instruction for incrementing the value of a pixel of interest in the x direction;

colinc: an instruction for incrementing the value of a pixel of interest in the y direction.

The processor 300 includes an adder 25 for adding together the operational results from the first multiply-and-accumulate arithmetic unit 11, the operational results from the second multiply-and-accumulate arithmetic unit 12, the operational results from the third multiply-and-accumulate arithmetic unit 12 and an offset T from constant 46, and the non-linear acting unit 26 for deciding an output halftone image value of a small number of bits based upon the results from the adder 25. Note that the offset T46 is set by the CPU 6 in accordance with an image processing method.

The product sum B(i,j; k,l)$u_{kl}$ is calculated by the first multiply-and-accumulate arithmetic unit 11, the product sum A(i,j; k,l)$y_{kl}$ is calculated by the second multiply-and-accumulate arithmetic unit 12, the product sum C(i,j; k,l)$x_{kl}$ is calculated by the third multiply-and-accumulate arithmetic unit 32, and the sum B(i,j; k,l)$u_{kl}$+A(i,j; k,l)$y_{kl}$+C(i,j; k,l)$x_{kl}$+$T_{kl}$ is obtained by the adder 25, where $T_{kl}$ is a value represented by the offset T46. The non-linear acting unit 26 for deciding the present-time output halftone image value of a small number of bits of each pixel basically is constituted by a RAM, ROM and PLA for programmably storing a non-linear characteristic. However, in a case where an output is fixed at two bits or the like, the basic component is a comparator. In this case, whether the result of the multiply-and-accumulate operation is positive or negative is distinguished by the most significant bit so that it may be determined at which position along the x axis of the non-linear function this value is located.

FIG. 5 is a diagram showing an example of the non-linear function used by the non-linear acting unit 26. The output is assumed to be two bits. Here the result from the adder 25 is decided as being the x axis and the value of f(x) thus determined is decided as being an output halftone image value composed of a small number of bits. The non-linear function used by the non-linear acting unit 26 also can be selected by the CPU 6 in accordance with the command from the image processing selector 7. The number of output bits can be selected by this selection of function. When, in a manner similar to that of the processor 100 described above, dynamic digital processing is executed through a sequential operation by the single processor 300, a large number of recursion computations are required and a large quantity of computations and a long period of time are needed for the output halftone image to converge to an optimum value.

Accordingly, in this embodiment, each processor is provided with a unidirectional data bus and a linked-structure processor network is adopted to accelerate the convergence of the output of the DTCNN. By virtue of this architecture, it is possible for a pipeline operation between processors. The architecture of this network is the same as that shown in FIG. 3.

Since descriptions rendered above in connection with FIGS. 6 and 8 regarding the processor 100 hold also with regard to the processor 300, these descriptions are deleted here.

Figure 11:
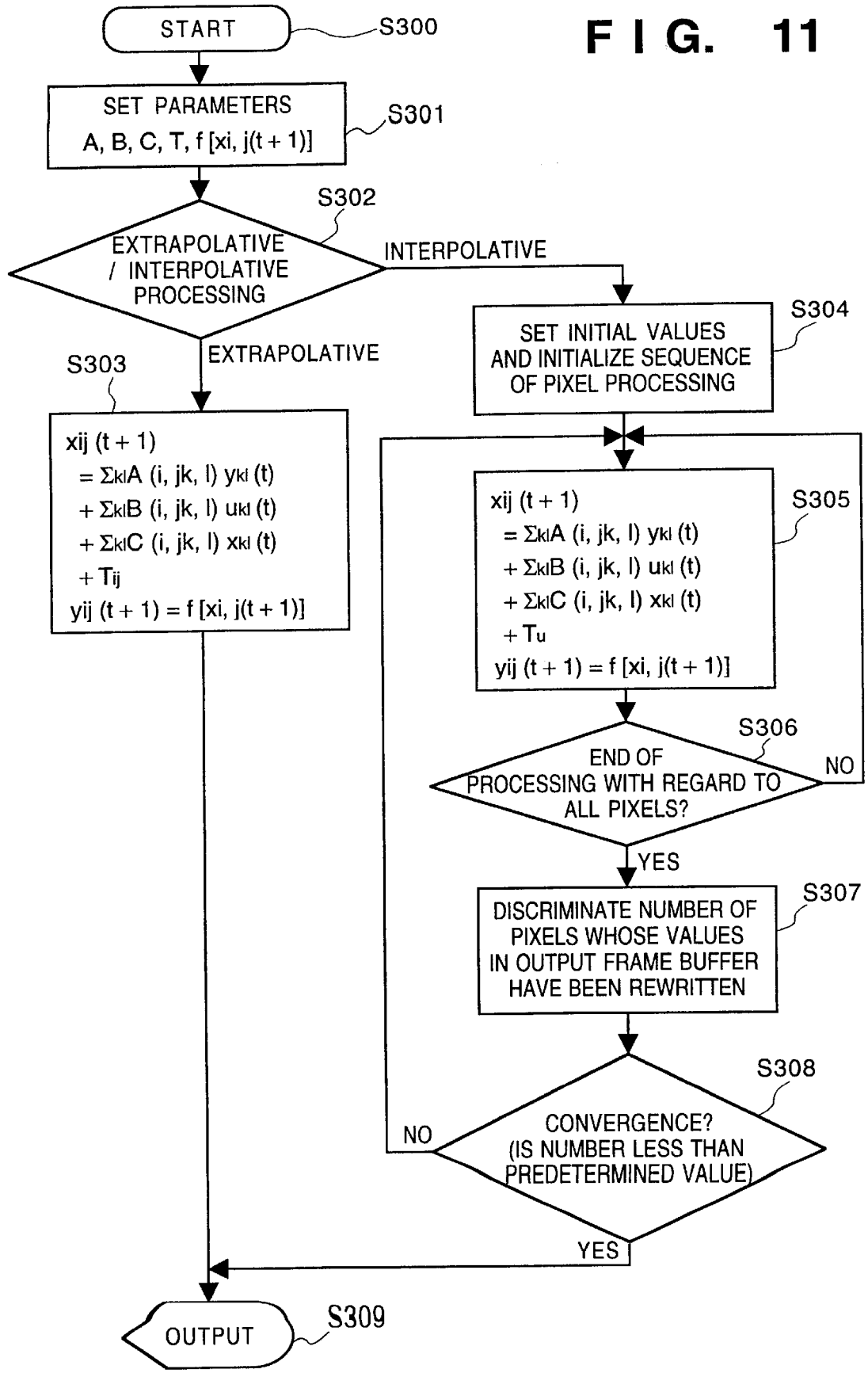
FIG. 11 is a processing flowchart associated with the processor element of FIG. 10.

FIG. 11 illustrates the operation control flowchart of the processor 300 conforming to the selection of the parameters A, B, C and T, and the non-linear function.

Step 300 (S300)

Operation is started.

Step 301 (S301)

In accordance with the selection from the selector 7 of FIG. 2, the CPU 6 instructs the image processing unit 3 of the template values A, B, C, constant T of the offset function and non-linear function f[xi,j(t+1)] to be used by the image processing unit 3.

Step 302 (S302)

The image processing method (extrapolative or interpolative) is discriminated based upon the specified template values. Extrapolative dither processing is discriminated when A=C=0 holds. In a case where A=B=C=−A, extrapolative error diffusion processing is discriminated. In a case where C=0 holds and A, B are used, the error minimization dynamics method, which is interpolative processing, is discriminated.

Step 303 (S303)

A command is sent to the processor 300 and the operation based upon Equation (35) is performed. The ykl(t) which prevails at this time is adopted as the output value. Since extrapolative processing is executed here, the output value is decided by a single processing operation.

Step 304 (S304)

An initial value is set in the output frame buffer 4 at step S304. Here random bi-level data are set in the output frame buffer. Further, when the multiply-and-accumulate operation is executed with regard to all pixel input data of one screen, the sequence of this operation is set at step S304. The sequence of this operation is given an order such that all pixels will be scanned randomly.

Step 305 (S305)

At step S305, a command is issued to the processor element 300 at step S305 based upon the order decided at step S304, the operation of Equation (35) is executed and an output value is obtained.

This result is sent to the output frame buffer 6. In a case where this is different from an already stored value, the value is rewritten.

Step 306 (S306)

It is determined at step S306 whether the processing of all entered pixels has ended. If this processing has not ended, the program proceeds to step S305. Here the pixel of interest is processing based upon the sequence of pixel processing set randomly at step S304, and the multiply-and-accumulate operation is executed.

Step 307 (S307)

If it is determined at step S306 that the processing of all pixels has ended, then the program proceeds to step S307, where the number of pixels rewritten in the output frame buffer 4 is discriminated.

Step 308 (S308), Step 309 (S309)

It is determined whether the number of pixels discriminated at step S307 is less than a predetermined value. If the number is less than the predetermined value, then it is judged that the operation based upon the neural network has converged, and the program proceeds to step S309. Here one screen of data in the output frame buffer 4 are sent to the FLCD display. If it is found at step S308 that the number of pixels discriminated at step S307 is greater than the predetermined value, then the processing of steps S305~S307 is repeated.

In this flowchart, the image processing method is discriminated based upon the template values. However, an arrangement may be adopted in which the image processing method can be selected separately of the template values at step S301.

In accordance with the first embodiment, a digital CNN is constructed based upon a discrete-time cellular neural network (DTCNN). As a result, it is possible to provide a general-purpose digital image processor which preserves the features of digital processing, namely universality, memory property, ease of control, ease of integration and ease of establishing the pipeline architecture, while at the same time making it possible to execute almost all image processing by the spatio-temporal dynamics achievable with a CNN. In particular, it is possible to execute not only the conventional dither method, which is non-dynamic processing, and quantization image processing using a small number of bits based upon the extrapolative error diffusion method, but also the interpolative error diffusion method which discretely diffuses error to the surrounding two-dimensional neighborhood system, as well as the error minimization dynamic methods, by pipeline operation. Moreover, it is possible to provide a universal digital image processor capable of executing various types of image processing merely by setting templates.

In the first embodiment, an example in which an FLCD serves as the output unit is described. However, the present invention is not limited to an FLCD but can also be applied a display unit or to an inkjet or electrophotographic printer.

Second Embodiment

An example in which image processing (binarization or grayscaling) by a DTCNN is applied to an input moving image will now be described as a second embodiment of the present invention.

Figure 12:
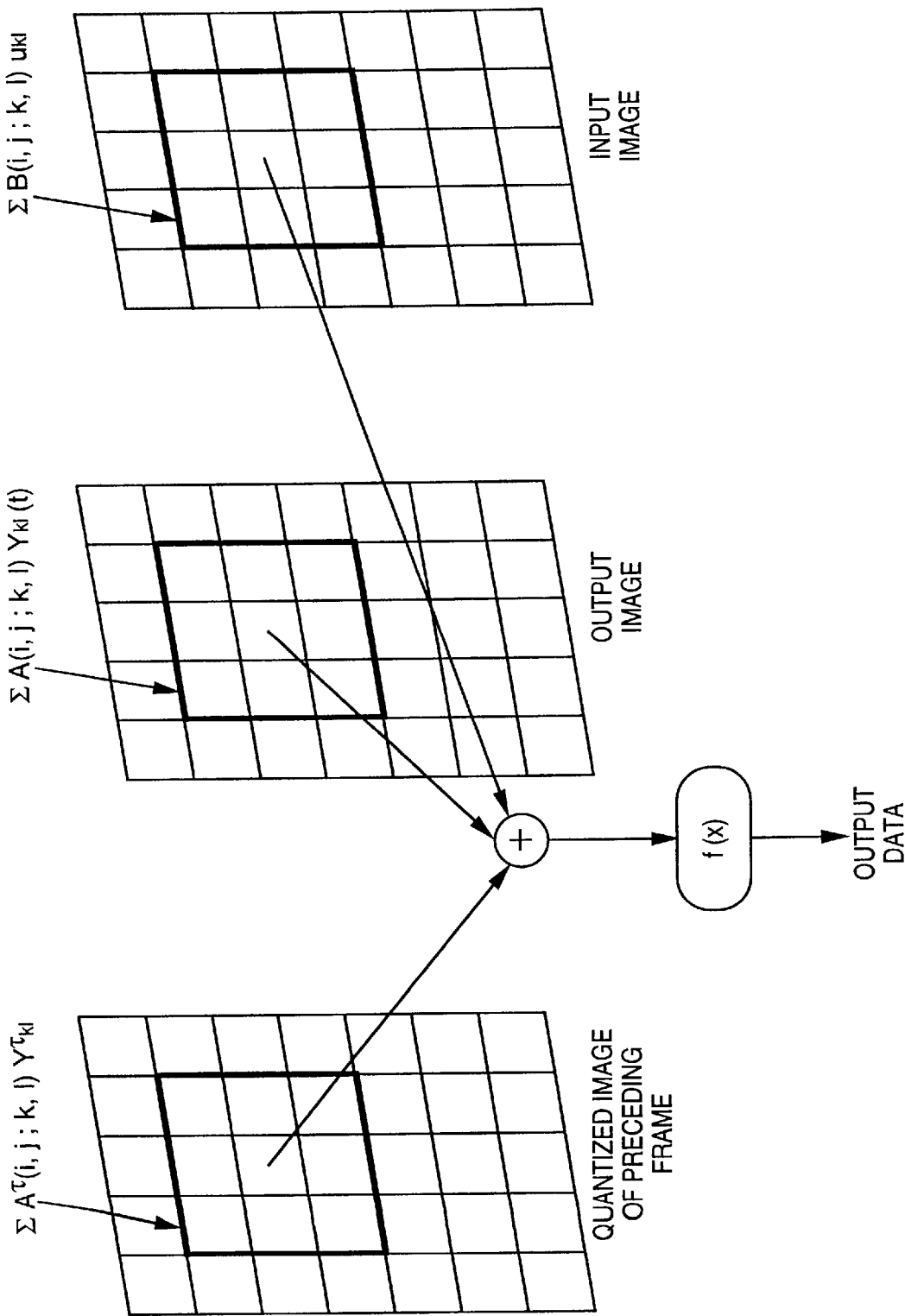
FIG. 12 is a diagram for describing the concept of image processing using a DTCNN in a second embodiment of the invention.

FIG. 12 is a diagram for describing the concept of image processing using a DTCNN in a second embodiment of the invention.

In FIG. 12, the product sum $\Sigma B(i,j; k,l)u_{kl}$ of input gray-level images in a 3×3 neighborhood image area of an input image and input weighting values, the product sum $\Sigma A(i,j; k,l)y_{kl}$ of an output image in a 3×3 neighborhood image area of an output image and output weighting values, and the product sum $\Sigma A^{\tau}(i,j; k,l)y^{\tau}_{kl}$ of an output image of a preceding frame in a 3×3 neighborhood image area of an output image one frame prior and output weighting values are added, and the resulting sum is converted to output data by a non-linear output function f(x).

The input image is a gray-level image of a large number of bits, e.g., eight bits per pixel.

The principles of the second embodiment will now be described.

In a case where a moving image obtained by quantization to binary-valued or multivalued data by a DTCNN is displayed on an FLCD display, temporal high-frequency components appear and the display develops flicker in still areas of the moving image when the pixel level constantly changes owing to quantization.

Accordingly, by so arranging it that a pixel level the same as that of the preceding frame is adopted in a still area, this flicker can be suppressed.

To achieve this, a limiting term which adopts a pixel level the same as that of the preceding frame is added to the cost function, each parameter of the DTCNN is decided in accordance with the resulting function and, at the time of quantization, the quantized image of the preceding frame is applied as an initial value.

In an area in which there is strong correlation between frames (such as a still area), the quantized image of the preceding frame can be a local solution.

Accordingly, when the quantized image of the preceding frame is given as an initial value of a cell and the DTCNN is made to operate, the quantized image of the preceding frame becomes a local solution in the still area. By effecting trapping here, it can be so arranged that a pixel configuration the same as that of the preceding frame can be obtained to a certain degree. Since the initial value will approximate the local solution in this case, convergence takes place very quickly.

However, in order to so arrange it that a pixel level the same as that of the preceding frame is obtained in the still area, the above alone is insufficient; it is further required that the limiting term for this purpose be added to the cost function.

The cost function in this case is as follows:

$$C_1(y,u) = \frac{1}{MN} \sum_{(i,j)} \alpha_{ij} \sum_{(k,l)} H'(i,j;k,l) y_{kl} - u_{ij})^2 \qquad (36)$$

$$C_2(y,u) = \frac{1}{MN} \sum_{(i,j)} \beta_{ij}(y_{ij} - u_{ij})^2$$

$$C_3(y,u) = \frac{1}{MN} \sum_{(i,j)} \gamma_{ij}(y_{ij} - y_{ij}^\tau)^2$$

dist(y,u)=$C_1$(y,u)+$C_2$(y,u)+$C_3$(y,u)

where H' represents a filter of human vision, y a quantized image expressed by halftones, y' a quantized image of the preceding frame, and u the original image.

Further, $C_1$(y,u) is a term so configured that the quantized image y visually sensed by a human being will approximate the original image u, $C_2$(y,u) is a limiting term so configured that the output level of a cell when an image is quantized will approximate the pixel level of the original image, and $C_3$(y,u) is a limiting term so configured that an output level, which is as similar to that of the quantized image of the preceding frame as possible, can be obtained.

The value of $\gamma_{ij}$ is decided in such a manner that the limiting term $C_3$(y,u) is strengthened in a still area and suppressed in a moving area.

Conversely, since it is attempted to obtain an output level the same as that of the preceding frame where the limiting term $C_3$(y,u) is strong, the limiting term $C_2$(y,u) is unnecessary.

By adopting this arrangement, an output frame the same as that of the preceding frame is adopted only in a still area. In a case where there is almost no correlation between frames, as when the area in question is a moving area or when there is a change from one scene to another, it is possible to make it difficult for the influence of the quantized image of the preceding frame to be passed on.

First, a pixel change $d_{ij}$ caused by motion from the preceding frame is obtained from the following equation based upon the absolute value of the pixel change between frames:

$$d_{ij} = \left| \sum_{(k,l)} G(i,j;k,l) u_{kl} - \sum_{(k,l)} G(i,j;k,l) u^\tau kl \right| \qquad (37)$$

where G(i,j; k,l) is a low-pass filter for removing noise.

Further, $\gamma_{ij}$, $\beta_{ij}$ are decided by the following equation:

$\gamma_{ij}=\gamma\exp(-Td_{ij})$ $\beta_{ij}=\beta[1-\exp(-Td_{ij})]$ \qquad (38)

where T, $\gamma$, $\beta$ are positive constants.

It is so arranged that use is made of a logarithmic function to attenuate $\gamma_{ij}$ in dependence upon the pixel change d due to motion from the preceding frame. Conversely, it is so arranged that $\beta_{ij}$ increases in dependence upon a point (i,j) of a pixel. The attenuation constant T is decided upon taking into account the magnitude of noise in the moving image.

The operation of the cell differs from that of the DTCNN of the first embodiment in that there is a time-lag template.

A template A$\tau$ in which the output of the time-lag cell is adopted as the next dynamic input is referred to as the time-lag template.

If the original image has a size of M×N, then M×N cells are arranged similarly in a two-dimensional grid, each pixel value of the original image and the quantized image of the preceding frame are normalized to corresponding values in the interval (−1,1), and these values are applied to the inputs u, $y^\tau$ of the respective cells.

If we let the ordinary input of a cell be $u_{ij}$ (0≦i<M; 0≦j<N), let the time-lag input be $y_{ij}\tau$ (0≦i<M; 0≦j<N) and let the output be $y_{ij}$ (0≦i<M; 0≦j<N), then the operation of the cell will be defined as indicated by the following equation:

$$x_{ij} = \sum_{(kl)} A(i,j;k,l) y_{kl}(t) + \qquad (39)$$
$$\sum_{(kl)} A^\tau(i,j;k,l) y^\tau(i,j;k,l) y_{kl}^\tau +$$
$$\sum_{(kl)} B(i,j;k,l) u_{kl} + S$$

$$y_{ij}(t+1) = f(x_{ij})$$

where A(i,j; k,l), $A^\tau$(i,j; k,l) and B(i,j; k,l) represent the weighting applied to the connection from cell (k,l) to cell (i,j).

If we let $\delta$ represent the value of the diagonal component of the matrix H$\tau$H, the value capable of being the coefficient of $y_{ij}^2$ in the cost function dist(y,u) will be $\alpha_{ij}\delta$ in the $C_1$(y,u) term, $\beta_{ij}$ in the $C_2$(y,u) term and $\gamma_{ij}$ in the $C_3$(y,u) term. Therefore, we have $\alpha_{ij}\delta+\beta_{ij}+\gamma_{ij}=1$ \qquad (40)

Accordingly, we have $$\alpha_{ij} = \frac{1 - \beta_{ij} - \gamma_{ij}}{\delta} \qquad (41)$$

The parameters of the network are decided by comparing the cost function dist(y,u) and the energy function of the DTCNN.

$A'=\Phi'^T\{-H'^TH'+\text{diag}\{H'^TH'\}\}$ $A'^\tau=\Theta'$ $B'=\Theta^T H'+\beta I'$ \qquad (42)

where $\Phi$ represents a matrix in which the diagonal component is $\alpha_{ij}$ and the non-diagonal component is 0, and $\Theta$ represents a matrix in which the diagonal component is $\gamma_{ij}$ and the non-diagonal component is 0.

The specific configuration of the second embodiment of the invention will now be described with reference to the drawings.

Figure 13:
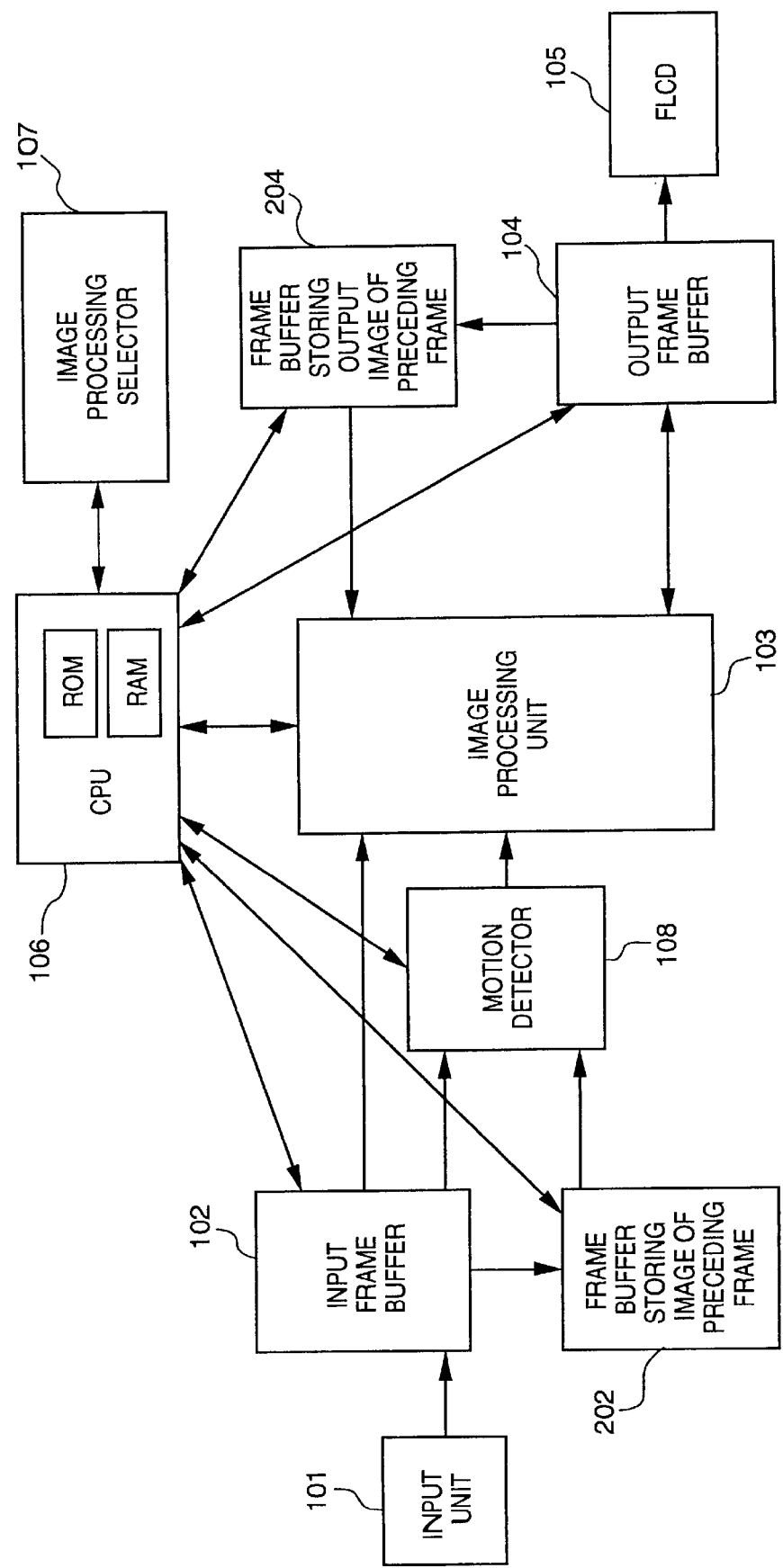
FIG. 13 is a block diagram illustrating the configuration of a display system internally incorporating a digital image processor according to the second embodiment.

FIG. 13 is a block diagram illustrating the configuration of a display system internally incorporating a digital image processor according to the second embodiment of the invention.

Shown in FIG. 2 is an image input unit 101 for entering a gray-level image comprising a plurality of bits per pixel. By way of example, the image input unit is constituted by a camera, scanner and computer.

An input frame buffer 102 temporarily stores at least a plurality of lines of image data. Numeral 202 denotes a frame buffer in which the input image from the preceding frame is stored beforehand. An image processing unit 103 executes processing to quantize the multivalued gray-level image data, which comprises a plurality of bits per pixel, to image data having a smaller number of levels (bits). In accordance with the selection of template and non-linear characteristic described above, the image processing unit 103 is capable of selecting the desired image processing from a plurality of types of image processing. An output frame buffer 104 stores the quantized output data. Numeral 204 denotes a frame buffer for holding the output image of the preceding frame. Numeral 105 denotes a ferroelectric liquid crystal display (FLCD). Numeral 108 denotes a motion sensing unit for sensing a moving area by comparing the data in the frame buffer 102 and the data in the frame buffer 202.

A CPU 106, which is connected to input frame buffers 102, 202, image processing unit 103, output frame buffer 104, frame buffer 204 storing the output image of the preceding frame and the motion sensor 108, performs address control for data transfer and control of image processing. The CPU 106 is provided with a ROM storing a control program and a RAM serving as a work area. An image processing selector 107 allows the operator to select image processing to be executed by the image processing unit 3.

Figure 14:
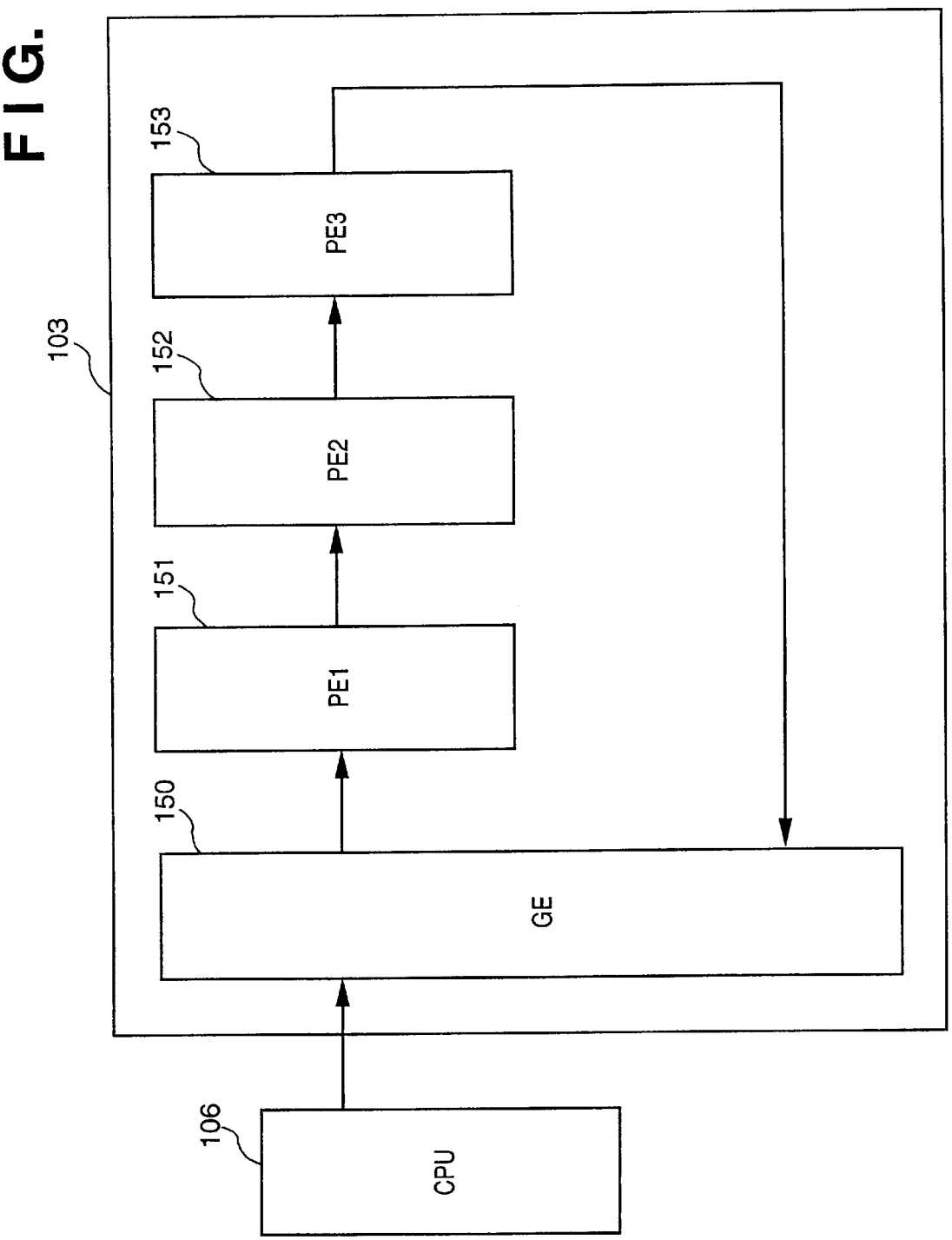
FIG. 14 is a diagram showing an image processing unit from FIG. 13 in greater detail, the unit consisting of a plurality of processor elements connected in pipeline fashion.

FIG. 14 illustrates the details of the image processing unit 103. The image processing unit 103 comprises processor elements (PEs) 151~153 and a gateway processor (GE) 150.

The PEs 151, 152 and 153 are identically constructed processors and are pipeline-connected. Each processes a different position of the input image.

Figure 15:
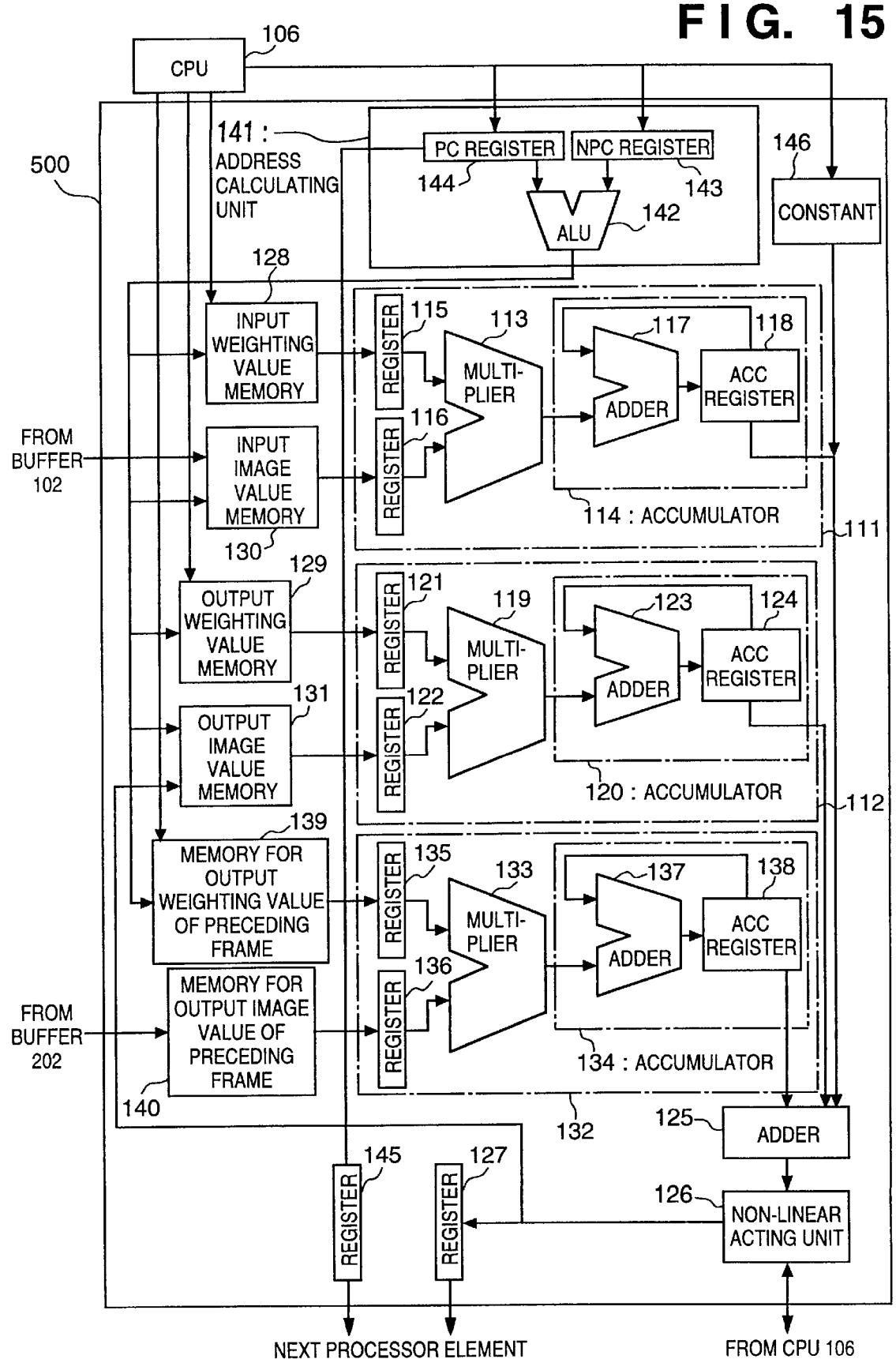
FIG. 15 is a block diagram showing the details of a processor element according to the second embodiment.

FIG. 15 is a block diagram showing the details of a processor element PE. The PEs 151, 152 and 153 each consist of the hardware shown in FIG. 15. Here one of the PEs is designated at 500. The PE 500 includes a memory 130 for storing a gray-level image that resides in a neighborhood image area composed of a plurality of pixels sent from the input frame buffer 102, a memory 128 for storing each weighing value in the neighborhood image area, a memory 131 for storing an output halftone image of a small number of bits in a neighborhood image area, a memory 129 for storing an output weighting value, a memory 140 for storing the output image value of the preceding frame, a memory 139 for storing the weighting value of the preceding frame, and an address calculating unit 141 which calculates addresses for accessing the memories 128, 129, 130, 131, 139 and 140.

The memories 128, 129, 130, 131, 139 and 140 are located within the processor but may be provided externally of the processor.

A plurality of weighting values are stored in each of the memories 128, 129 and 130. A weighting value is selected in accordance with a command from the CPU 106 indicating the type of image processing.

The processor 500 further includes a first multiply-and-accumulate arithmetic unit 111 for calculating the product sum $B(i,j; k,l)u_{kl}$ of data in the memory 128 storing the input weighting values in the neighborhood image area and the data in the memory 130 storing the input gray-level image. The first multiply-and-accumulate arithmetic unit 111 comprises a multiplier 113, an accumulator 114 and registers 116, 115. The registers 115, 116 latch the input gray-level image $u_{kl}$ and the weighting value $B(i,j; k,l)$ fetched from the memories 130, 128, respectively. The accumulator 114 includes an adder 117 and an ACC register 118.

The processor 500 further includes a second multiply-and-accumulate arithmetic unit 112 for calculating the product sum $A(i,j; k,l)y_{kl}(t)$ of data in the memory 129 storing the output weighting values and the output halftone image values in the memory 131. The second multiply-and-accumulate arithmetic unit 112 comprises a multiplier 119, an accumulator 120 and registers 121, 122.

The registers 122, 121 latch the output halftone image $Y_{kl}(t)$ and weighting value $A(i,j; k,l)$ fetched from the memories 131, 129, respectively. The accumulator 120 includes the adder 123 and the ACC register 124.

The processor 500 further includes a third multiply-and-accumulate arithmetic unit 132 for calculating the product sum $A^\tau(i,j; k,l)y_{kl}^c$ of data in the memory 139 storing the output weighting value of the preceding frame and the output image value of the preceding frame in the memory 140. The third multiply-and-accumulate arithmetic unit 132 comprises a multiplier 133, an accumulator 134 and registers 135, 136.

The registers 136, 135 the latched output halftone image $Y_{kl}^\tau$ of the preceding frame and weighting value $A^\tau(i,j; k,l)$ fetched from the memories 140, 139, respectively. The accumulator 134 includes an adder 137 and an ACC register 138.

The registers 118, 124, 138, 127, 143, 144 and 145 in processor 500 perform the functions described below.

The PC register 144 stores the address of a pixel to be processed. The NPC register 143 stores the image position of a neighborhood system.

As for the values stored in the NPC register 143, values from (−3,−3) to (3,3) are stored, as shown in FIG. 7, assuming that the neighborhood system used in processing has a maximum size of 7×7. For this reason the register incorporates an incrementer that is capable of updating these values. When the operation for multiplying and accumulating weighting values in the neighborhood system and output halftone images of a low number of bits is performed, the addresses of the neighborhood pixels are calculated from the values in the NPC register 143 and PC register 144, and these pixel values are fetched.

The ACC register 118 accumulates the results of calculating the product sum of the pixel of interest and its neighborhood system in the first multiply-and-accumulate arithmetic unit.

The ACC register 124 accumulates the results of calculating the product sum of the pixel of interest and its neighborhood system of the pixel of interest in the second multiply-and-accumulate arithmetic unit.

The ACC register 138 accumulates the results of calculating the product sum of the pixel of interest and its neighborhood system in the third multiply-and-accumulate arithmetic unit.

The multiply-and-accumulate calculation in cell operation is performed using the values in these registers 115, 116, 121, 122, 135, 136, 118, 124, 138.

Accordingly, at the stage of product-sum calculation, a two-stage pipeline stage, which consists of data fetching and multiplication/accumulation, is formed.

A register 127 and a register 145 are necessary for pipeline processing, described below, and make possible an exchange of data between processors. More specifically, the register 127 holds an output value (P-REG) obtained by the final calculation, and the register 145 holds an address (N-ADRS) used when this result is written in memory.

For example, in a case where the small number of output bits of the output halftone image value are two in number, the weighting should be seven bits+one sign bit, and the output should be two bits without a sign. Since the arithmetic multiplier is composed of two bits in this case, the multiply-and-accumulate operation can also be performed by constructing an array of adders.

The address calculating unit 141 calculates an address from the NPC register 143 and the PC register 144.

The processor 500 includes an adder 125 for adding together the operational results from the first multiply-and-accumulate arithmetic unit 111, the operational results from the second multiply-and-accumulate arithmetic unit 112 and the operational results from the third multiply-and-accumulate arithmetic unit 132, and a non-linear acting unit 126 for deciding an output halftone image value of a small number of bits based upon the results from the adder 125.

The product sum $B(i,j; k,l)u_{kl}$ is calculated by the first multiply-and-accumulate arithmetic unit 111, the product sum $A(i,j; k,l)y_{kl}$ is calculated by the second multiply-and-accumulate arithmetic unit 112, the product sum $A^\tau(i,j; k,l)y_{kl}^\tau$ is calculated by the third multiply-and-accumulate arithmetic unit 132, and the sum of $A(i,j; k,l)y_{kl}$, $B(i,j; k,l)u_{kl}$ and $A^\tau(i,j; k,l)y_{kl}^\tau$ is obtained by the adder 125.

The non-linear acting unit 126 for deciding the present-time output halftone image value of a small number of bits of each pixel basically is constituted by a RAM, ROM and PLA for programmably storing a non-linear characteristic. However, in a case where an output is fixed at two bits or the like, the basic component is a comparator.

In this case, whether the result of the multiply-and-accumulate operation is positive or negative is distinguished by the most significant bit so that it may be determined at which position along the x axis of the non-linear function this value is located.

The non-linear function used by the non-linear acting unit 126 can be the same as that shown in FIG. 5, by way of example. The output is assumed to be two bits in this case.

Here the result from the adder 125 is decided as being the x axis and the value of f(x) thus determined is taken as being an output halftone image value composed of a small number of bits. The non-linear function used by the non-linear acting unit 126 also can be selected by the CPU 106 in accordance with the command from the image processing selector 107. The number of output bits can be selected by this selection of function.

The second embodiment of the invention also is provided with a plurality of processor elements for processing different areas of an image, and these processor elements execute processing in pipeline connection. As a result, high-speed processing is possible in a manner similar to that of the first embodiment. The description based upon FIGS. 6 and 8 holds true for the second embodiment as well.

Figure 16:
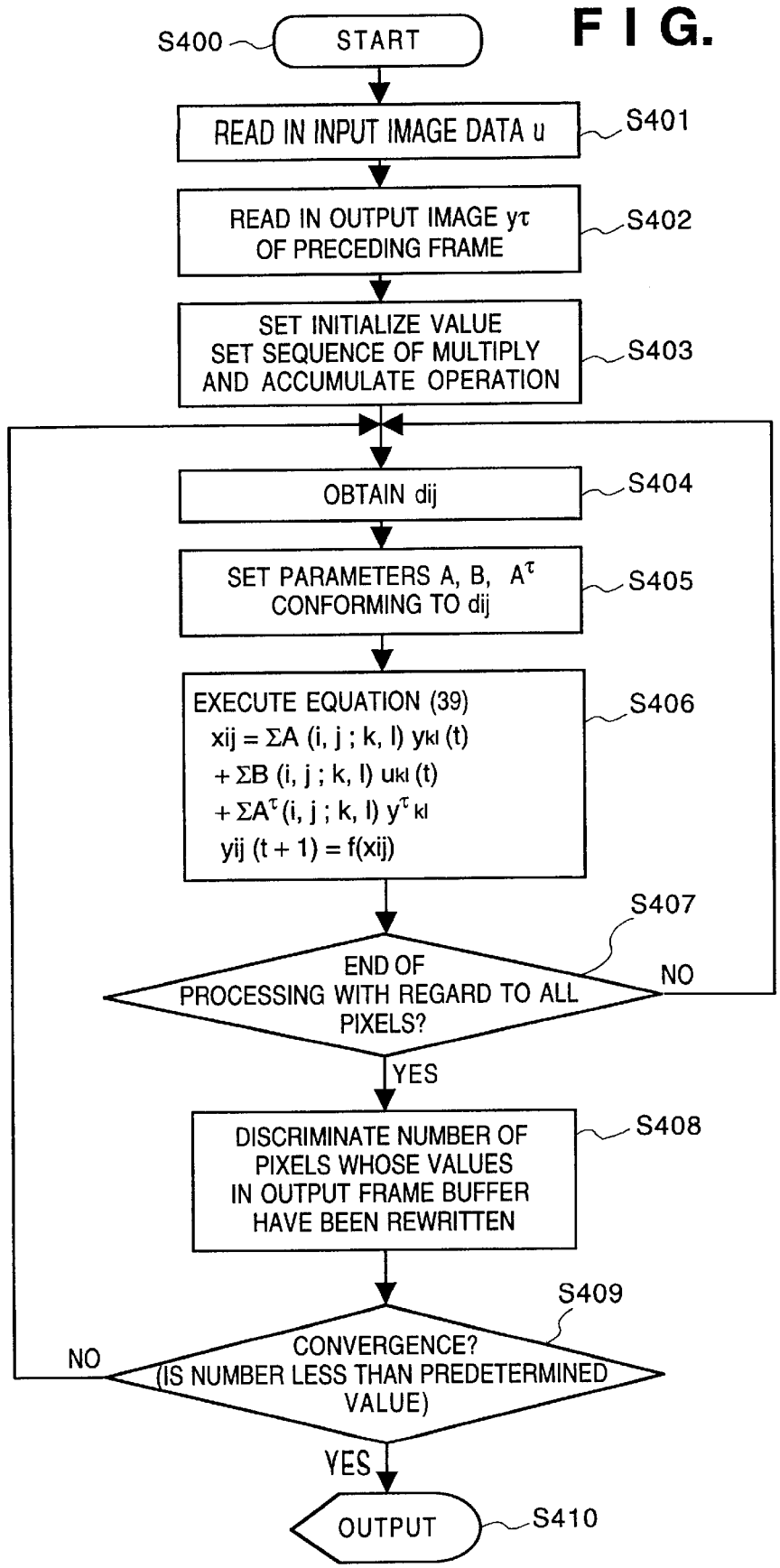
FIG. 16 is a processing flowchart associated with the processor element according to the second embodiment.

FIG. 16 illustrates the operation control flowchart of the processor 500. This control will be described. The flowchart of FIG. 16 is executed by the CPU 106.

Step 400 (S400)

Operation is started.

Step 401 (S401)

In accordance with the selection from the selector 107 of FIG. 13, the CPU 106 reads the input image u, which is used by the image processing unit 103, from the input frame buffer to the image processing unit 103.

Step 402 (S402)

In accordance with the selection from the selector 107 of FIG. 13, the CPU 106 reads the input image yτ of the preceding frame, which is used by the image processing unit 103, from the output frame buffer 204 to the image processing unit 103.

Step 403 (S403)

An initial value is set in the output frame buffer 104 at step S403. Here random output data are set in the output frame buffer. Further, when the multiply-and-accumulate operation is executed with regard to all pixel input data of one screen, the sequence of this operation is set at step 403. The sequence of this operation is so adapted that all pixels will be scanned randomly. Further, the values of T, γ and β in Equation (38) are set. An example is T=300, γ=0.30 and β=0.15.

Step 404 (S404)

The motion sensing unit 108 in FIG. 13 compares the data in the input frame buffer 104 and the data in the input frame buffer 204 of the preceding frame at step 404, thereby obtaining $d_{ij}$ of Equation (37) representing the pixel change between frames.

Step 405 (S405)

The A, $A^\tau$ and B of Equation (39) are decided at step 405 from the Equations (38), (40), (41) and (42) based upon $d_{ij}$ obtained at step 404.

Step 406 (S406)

Equation (39) is executed at step 406 using the values of the parameters A, $A^\tau$ and B decided at step 405 on the basis of the order decided at step 403, and the output value is obtained. This result is sent to the output frame buffer 104. In a case where this is different from an already stored value, the value is rewritten.

Step 407 (S407)

It is determined at step 406 whether the processing of all entered pixels has ended. If this processing has not ended, the program returns to step 404. Here motion is sensed, $d_{ij}$ is found and steps 405, 406 are executed again.

Step 408 (S408)

If it is determined at step 407 that the processing of all pixels has ended, then the program proceeds to step 408, where the number of pixels rewritten in the output frame buffer 104 is discriminated.

Step 409 (S409)

It is determined whether the number of pixels discriminated at step S409 is less than a predetermined value. If the number is less than the predetermined value, then it is judged that the operation based upon the neural network has converged, and the program proceeds to step 410. Here one screen of data in the output frame buffer 104 are sent to the FLCD display.

Further, if it is found at step S409 that the number of pixels discriminated at step 408 is greater than the predetermined value, then the processing of steps 404~408 is repeated.

Further, an arrangement may be adopted in which the number of times processing is executed up to step 408 is decided in advance and, when this number is reached, the program proceeds to step 410 even without convergence having been obtained.

Thus, in accordance with the second embodiment of the invention, a digital image processor based upon a neural network that is capable of obtaining a high-quality bi-level or multivalued image at high speed is applied to a moving image, thereby making it possible to obtain a moving image having a high image quality. In particular, by taking into account the product sum of image output state values and state weighting values of the preceding frame in the operation of the neural network, a quantized moving image which has a small number of bits and is faithful to the input moving image can be obtained. In addition, it is possible to obtain a high-quality moving image in which the background of the moving image is free of flicker.

Thus, in accordance with the present invention, as described above, an image processing apparatus that excels in universality, ease of control and ease of integration can be provided by constructing a neural network from digital circuitry.

Further, by selecting templates, a plurality of types of image processing can be executed by a single neural network.

Further, pipeline processing in a neural network can be implemented and a high-quality image can be obtained at high speed.

Further, by taking into account the multiplication and accumulation of state values and state weighting values in the operation of the neural network, a quantized image which has a small number of bits and is substantially faithful to the input image can be obtained.

Further, by taking into account the multiplication and accumulation of image output values and state weighting values of the preceding frame in the operation of the neural network, a quantized moving image which has a small number of bits and is faithful to the input moving image can be obtained. In addition, it is possible to obtain a high-quality moving image in which the background of the moving image is free of flicker.

As many apparently widely different embodiments of the present invention can be made without departing from the spirit and scope thereof, it is to be understood that the invention is not limited to the specific embodiments thereof except as defined in the appended claims.

What is claimed is:

1. A digital image processor for processing input image data based upon a cellular neural network, comprising:

first multiply-and accumulate arithmetic means for digitally processing multiplication and accumulation of input image data of a plurality of pixels and input weighting values in a predetermined area;

second multiply-and-accumulate arithmetic means for digitally processing multiplication and accumulation of output image data of a plurality of pixels and output weighting values in a predetermined area;

non-linear acting means for deciding output image data in accordance with results of processing from said first and second multiply-and-accumulate arithmetic means and non-linear characteristic parameters;

parameter selecting means for selecting input weighting values used by said first multiply-and-accumulate arithmetic means, output weighting values used by said second multiply-and-accumulate arithmetic means and non-linear characteristics parameters used by said non-linear acting means, wherein various types of image processing can be executed selectively in accordance with the selected input weighting values, output weighting values and non-linear characteristic parameters; and offset input means for entering a predetermined offset value, wherein said non-linear acting means decides output image data in accordance with results of processing from said first and second multiply-and-accumulate arithmetic means, said entered offset value and the non-linear characteristic parameters.

2. The processor according to claim 1, wherein said parameter selecting means is capable of selecting the offset value.

3. The processor according to claim 2, wherein extrapolative image processing for explicitly deciding output image data of each pixel in accordance with raster scanning, and interpolative image processing for repeating calculations while changing a value of output image data dynamically and implicitly deciding output image data when a certain value is attained, can be selected by selecting parameters by said parameter selecting means.

4. The processor according to claim 3, wherein the extrapolative image processing includes quantization image processing based upon a dither method and extrapolative error diffusion method, and the interpolative image processing includes quantization image processing based upon an interpolative error diffusion method and error minimization dynamics method.

5. The processor according to claim 1, wherein use is made of a plurality of processor elements each of which is composed of said first multiply-and-accumulate arithmetic means, said second multiply-and-accumulate means and said non-linear acting means, said plurality of processor elements are pipelined and input image data subjected to image processing is parallel.

6. The processor according to claim 1, wherein the processor has input weighting values and output weighting values so designed as to diminish an error corresponding to a difference between a value, which is obtained by applying a predetermined filter to output image data value, and an input image data value, and an error corresponding to a difference between an output image data value and an input image data value.

7. A digital image processor for processing input image data based upon a cellular neural network, comprising:

first multiply-and accumulate arithmetic means for digitally processing multiplication and accumulation of input image data of a plurality of pixels and input weighting values in a predetermined area;

second multiply-and-accumulate arithmetic means for digitally processing multiplication and accumulation of output image data of a plurality of pixels and output weighting values in a predetermined area;

third multiply-and-accumulate arithmetic means for digitally processing multiplication and accumulation of state values of a plurality of pixels and state weighting values in a predetermined area;

non-linear acting means for deciding output image data in accordance with results of processing from said first, second and third multiply-and-accumulate arithmetic means and non-linear characteristic parameters;

parameter selecting means for selecting input weighting values used by said first multiply-and-accumulate arithmetic means, output weighting values used by said second multiply-and-accumulate arithmetic means, state weighting values used by said third multiply-and-accumulate arithmetic means, and non-linear characteristic parameters used by said non-linear acting means, wherein various types of image processing can be executed selectively in accordance with the selected input weighting values, output weighting values, state weighting values and non-linear characteristic parameters; and offset input means for entering a predetermined offset value, wherein said non-linear acting means decides output image data in accordance with results of processing from said first, second and third multiply-and-accumulate arithmetic means, said entered offset value and the non-linear characteristic parameters.

8. The processor according to claim 7, wherein said parameter selecting means is capable of selecting the offset value.

9. The processor according to claim 8, wherein extrapolative image processing for explicitly deciding output image data of each pixel in accordance with raster scanning, and interpolative image processing for repeating calculations while changing a value of output image data dynamically and implicitly deciding output image data when a certain value is attained, can be selected by selecting parameters by said parameter selecting means.

10. The processor according to claim 9, wherein the extrapolative image processing includes quantization image processing based upon a dither method and extrapolative error diffusion method, and the interpolative image processing includes quantization image processing based upon an interpolative error diffusion method and error minimization dynamics method.

11. The processor according to claim 7, wherein use is made of a plurality of processor elements each of which is composed of said first multiply-and-accumulate arithmetic means, said third multiply-and-accumulate arithmetic means and said non-linear acting means, said plurality of processor elements are pipelined and input image data subjected to image processing is parallel.

12. A digital image processor for processing input image data based upon a cellular neural network, comprising:

first multiply-and-accumulate arithmetic means for digitally processing multiplication and accumulation of input image data of a plurality of pixels and input weighting values in a predetermined area;

second multiply-and-accumulate arithmetic means for digitally processing multiplication and accumulation of output image data of a plurality of pixels and first output weighting values in a predetermined area;

third multiply-and-accumulate arithmetic means for digitally processing multiplication and accumulation of output value data of a preceding frame image and second output weighting values; and non-linear acting means for deciding output image data in accordance with results of processing from said first, second and third multiply-and-accumulate arithmetic means and non-linear characteristic parameters.

13. The processor according to claim 12, further comprising:

detecting means for detecting state of change of a pixel, which is located in a predetermined area, between a preceding frame and a current frame; and setting means for setting the input weighting values, first output weighting values and second output weighting values in accordance with the state of change of the pixel detected by said detecting means.

14. A digital image processor for processing input image data based upon a cellular neural network, comprising:

first multiply-and-accumulate arithmetic means for digitally processing multiplication and accumulation of input image data of a plurality of pixels and input weighting values in a predetermined area;

second multiply-and-accumulate arithmetic means for digitally processing multiplication and accumulation of output image data of a plurality of pixels and output weighting values in a predetermined area; and non-linear acting means for deciding output image data in accordance with results of processing from said first and second multiply-and-accumulate arithmetic means and non-linear characteristic parameters; and wherein said non-linear acting means converts the input image data into the output data of 2 bits or more using non-linear characteristic parameters as defined in a step function with discontinuities having a range of −1 to 1, and converges the results of processing the range −1 to 1 of the non-linear characteristic parameters.

15. A digital image processor for processing input image data based upon a cellular neural network, comprising:

first multiply-and-accumulate arithmetic means for digitally processing multiplication and accumulation of input image data of a plurality of pixels and input weighting values in a predetermined area;

second multiply-and-accumulate arithmetic means for digitally processing multiplication and accumulation of output image data of a plurality of pixels and output weighting values in a predetermined area;

third multiply-and-accumulate arithmetic means for digitally processing multiplication and accumulation of output state values of a plurality of pixels an state weighting values in a predetermined area; and non-linear acting means for deciding output image data in accordance with results of processing from said first, second and third multiply-and-accumulate arithmetic means and non-linear characteristic parameters.

16. The digital image processor according to claim 15, wherein said non-linear acting means converts the input image data into the output date of 2 bits or more using non-linear characteristic parameters as defined in a step function with discontinuities having a range −1 to 1, and converges the results of processing to the range −1 to 1 of the non-linear characteristic parameters.

17. A digital image processing method for processing input image data based upon a cellular neural network, comprising:

a first multiply-and-accumulate arithmetic step of digitally processing multiplication and accumulation of input image data of a plurality of pixels and input weighting values in a predetermined area;

a second multiply-and-accumulate arithmetic step of digitally processing multiplication and accumulation of output image data of a plurality of pixels and output weighting values in a predetermined area; and a non-linear acting step of deciding output image data in accordance with results of processing at said first and second multiply-and-accumulate arithmetic steps and non-linear characteristic parameters; and wherein said non-linear acting step converts the input image data into the output date of 2 bits or more using non-linear characteristic parameters as defined in a step function with discontinuities having a range of −1 to 1, and converges the results of processing to the range −1 to 1 of the non-linear characteristic parameters.

* * * * *

UNITED STATES PATENT AND TRADEMARK OFFICE
CERTIFICATE OF CORRECTION

PATENT NO.   : 6,148,101
DATED        : November 14, 2000
INVENTOR(S)  : Tanaka et al.

Page 1 of 2

It is certified that error appears in the above-identified patent and that said Letters Patent is hereby corrected as shown below:

Title page,
Item [56], References Cited, FOREIGN PATENT DOCUMENTS, "0778696  11/1997 European Pat. Off." should read -- 0778696  6/1997 European Pat. Off. -- and "0474246  11/1992 European Pat. Off." should read -- 0474246  3/1992 European Pat. Off. --.

Column 2,
Line 20, "$y_{ij} = sgn(x)$" should read -- $y = sgn\ (x)$ --.

Column 4,
Line 17, close up left margin.

Column 6,
Line 57, "devided" should read -- divided --.

Column 7,
Line 61, "resemble" should read -- resembles --.

Column 11,
Line 40, "-the" should read -- the --.

Column 16,
Line 35, "are" should read -- is --.

Column 21,
Line 1, "11com" should read -- 11 com --;
Line 2, "14and" should read -- 14 and --;
Line 5, "14includes" should read -- 14 includes --; and
Line 60, "multipliction" should read -- multiplication --.

Column 22,
Line 49, "6in" should read -- 6 in --.

UNITED STATES PATENT AND TRADEMARK OFFICE
CERTIFICATE OF CORRECTION

PATENT NO. : 6,148,101
DATED : November 14, 2000
INVENTOR(S) : Tanaka et al.

Page 2 of 2

It is certified that error appears in the above-identified patent and that said Letters Patent is hereby corrected as shown below:

<u>Column 28,</u>
Line 25, "135" should read -- 135, --.

<u>Column 34,</u>
Line 26, "an" should read -- and --;
Line 34, "date" should read -- data --; and
Line 55, "date" should read -- data --.

Signed and Sealed this

Fifth Day of March, 2002

Attest:

JAMES E. ROGAN
Attesting Officer    Director of the United States Patent and Trademark Office